(12) United States Patent
Kurashima

(10) Patent No.: US 10,459,171 B2
(45) Date of Patent: Oct. 29, 2019

(54) OPTICAL TRANSCEIVER

(71) Applicant: SUMITOMO ELECTRIC INDUSTRIES, LTD., Osaka-shi (JP)

(72) Inventor: Hiromi Kurashima, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 16/154,866

(22) Filed: Oct. 9, 2018

(65) Prior Publication Data

US 2019/0107676 A1    Apr. 11, 2019

(30) Foreign Application Priority Data

Oct. 10, 2017  (JP) ................. 2017-196895

(51) Int. Cl.
  *G02B 6/38*  (2006.01)
  *G02B 6/42*  (2006.01)

(52) U.S. Cl.
  CPC ......... *G02B 6/3817* (2013.01); *G02B 6/4214* (2013.01); *G02B 6/4292* (2013.01)

(58) Field of Classification Search
  CPC ... G02B 6/3817; G02B 6/4292; G02B 6/4214
  See application file for complete search history.

(56) References Cited

U.S. PATENT DOCUMENTS 8,083,547 B2 * 12/2011 Roth ............... G02B 6/3817
                                                  439/607.1

FOREIGN PATENT DOCUMENTS

JP    2002-353471 A    12/2002

* cited by examiner

*Primary Examiner* — Ryan A Lepisto
(74) *Attorney, Agent, or Firm* — Baker Botts L.L.P.; Michael A. Sartori

(57) ABSTRACT

An optical transceiver of an embodiment comprises a housing having a rectangular solid-like shape extending in a direction pluggable into the host system, an electrical plug provided on an end of the housing closer to the host system in the direction pluggable into the host system, the electrical plug being electrically connected with the host system when the optical transceiver is plugged into the host system, and a cover provided on the end of the housing, the cover covering at least a part of the electrical plug when the optical transceiver is extracted from the host system, the cover moving with respect to the housing toward an extraction direction opposite to a direction of inserting the optical transceiver into the host system when the optical transceiver is inserted into the host system.

5 Claims, 22 Drawing Sheets

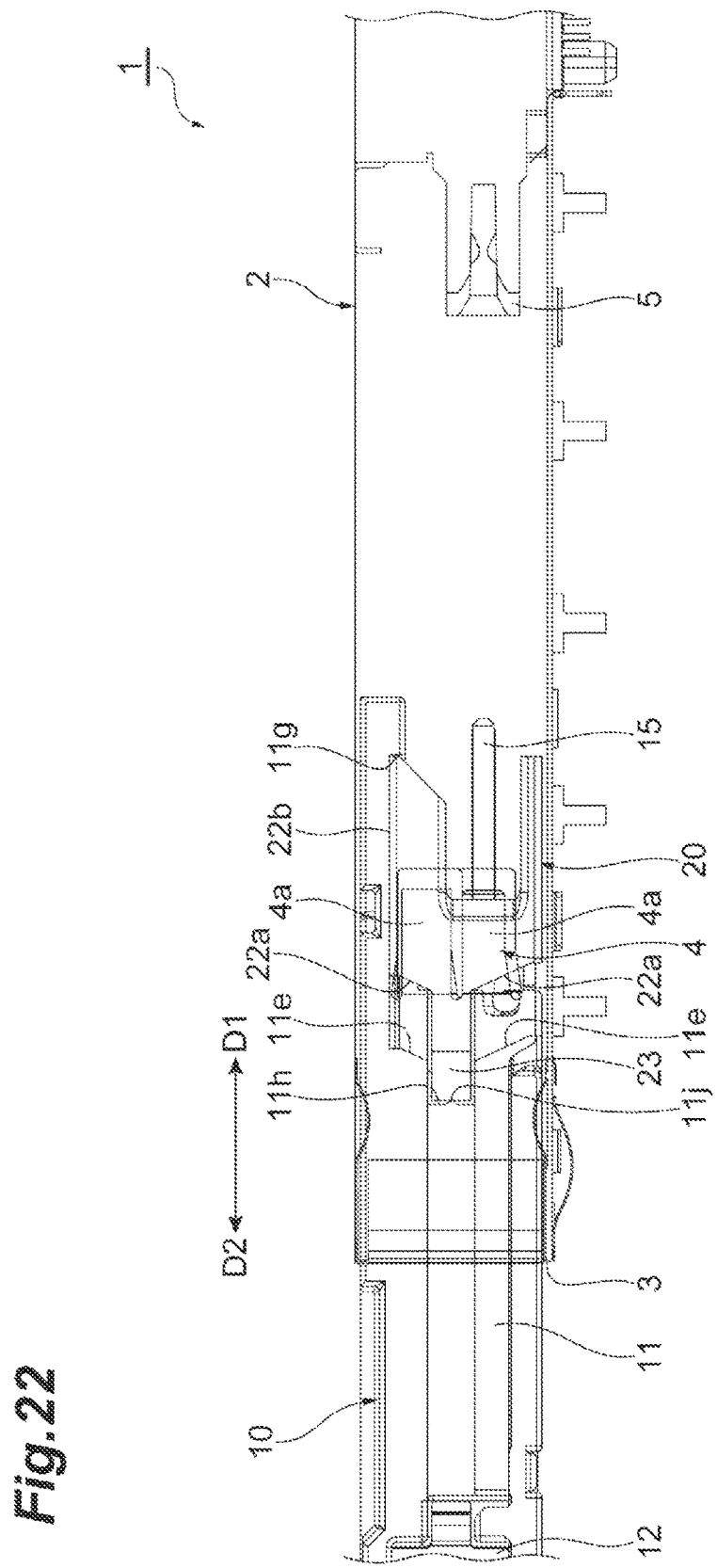

OPTICAL TRANSCEIVER

TECHNICAL FIELD

An aspect of the present invention relates to an optical transceiver.

BACKGROUND

Japanese Unexamined Patent Publication No. 2002-353471 discloses an SFP (Small Form factor Pluggable) optical transceiver defined in the MSA (Multi-Source Agreement) standard. This optical transceiver includes an optical module part, a connecting component, a circuit board, an outer case housing the optical module part, the connecting component and the circuit board and having a rectangular cross section, and a board supporting member fixed to a rear end of the outer case and supporting the circuit board. The optical module part includes a light emitting elements and a light receiving elements as optic/electric converting elements, and is connected with the circuit board using the connecting component. A part of the outer case and the board supporting member constitute a plug part which is plugged into a cage connector of a motherboard. The circuit board has a card edge connector part on the rear end side thereof, and the card edge connector part protrudes from the board supporting member toward the rear end side of the optical transceiver. When the plug part is plugged into the cage connector, the card edge connector part is electrically connected with a terminal inside the cage connector. This connection allows the light emitting elements and the light receiving elements to be electrically connected with an electric circuit on the motherboard side via a circuit formed on the circuit board.

SUMMARY

There has been proposed, for the optical transceiver, a two-dimensional arrangement of the terminals for reducing an outer shape, addressing increase in the number of terminals of the above card edge connector part (electrical plug) in order to pursue more-advanced high functionality of the optical transceiver. In the two-dimensional arrangement of the terminals, an area per one terminal decreases, but an area occupied by the entire electrical plug increases. The larger the area of the electrical plug, the higher a possibility that fingers or the like touch the terminal by mistake, and touching by human body may lead to electrical damage to the circuit. Therefore, the terminal should be reliably protected even if the area of the electrical plug increases.

An aspect of the present invention has an object to provide an optical transceiver which can reliably protect the terminal even if the area of the electrical plug increases.

An optical transceiver according to an aspect of the invention is an optical transceiver pluggable into an electronic apparatus, comprising a housing having a rectangular solid-like shape extending in a direction pluggable into the electronic apparatus, an electrical plug provided on an end of the housing closer to the electronic apparatus in the direction pluggable into the electronic apparatus, the electrical plug being electrically connected with the electronic apparatus when the optical transceiver is plugged into the electronic apparatus, and a cover provided on the end of the housing, the cover covering at least a part of the electrical plug when the optical transceiver is extracted from the electronic apparatus, the cover moving with respect to the housing toward an extraction direction opposite to a direction of inserting the housing into the electronic apparatus when the optical transceiver is inserted into the electronic apparatus.

BRIEF DESCRIPTION OF THE DRAWINGS

FIG. 22 is a lateral view of the optical transceiver and the cage illustrating a procedure following that in FIG. 21.

DETAILED DESCRIPTION

Figure 1:
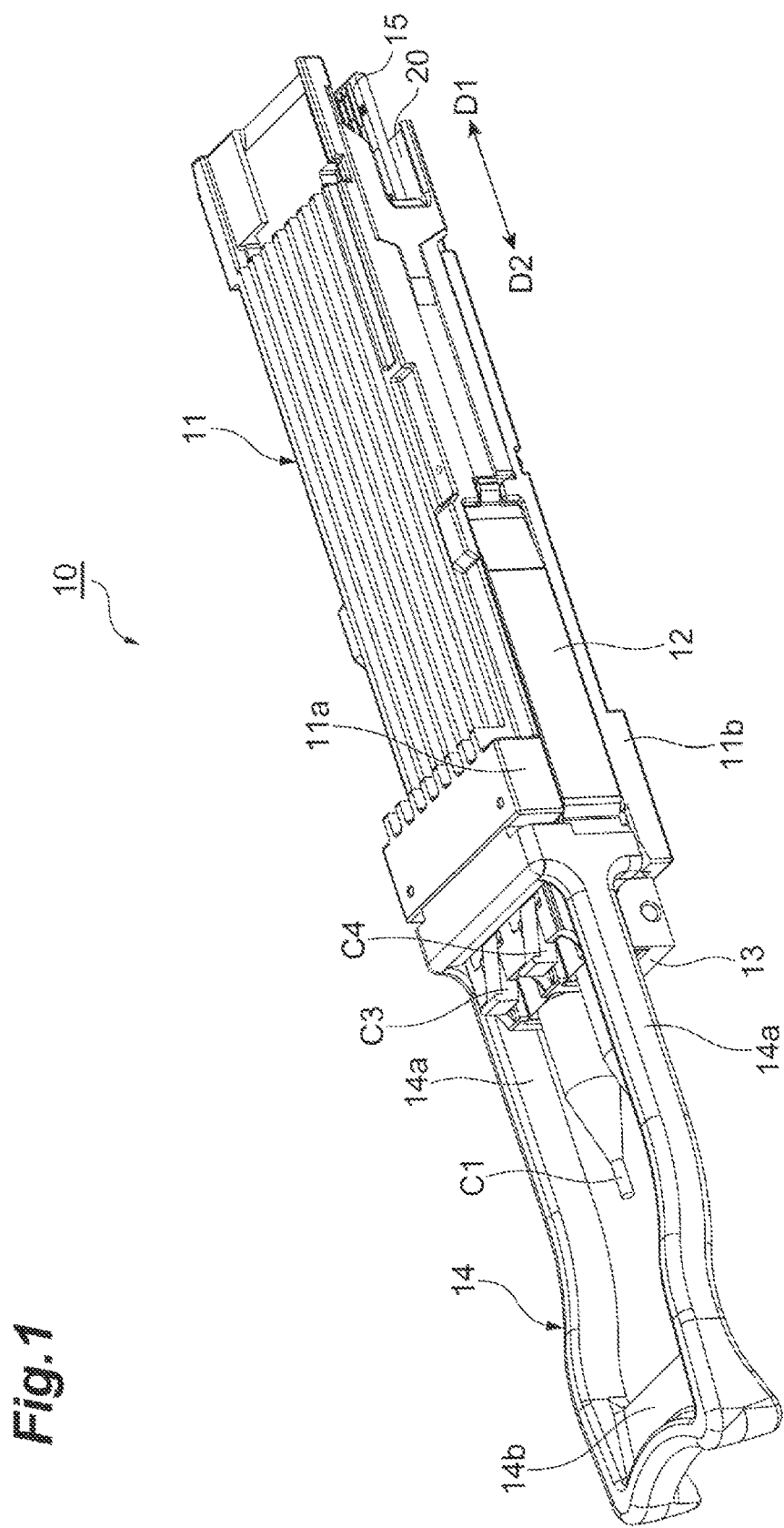
FIG. 1 is a perspective view illustrating an optical transceiver according to an embodiment.

A description is given below of examples of an optical transceiver according to an embodiment referring to the drawings. Note that the invention is not limited to examples below, and is intended to be shown in the Claims and include all changes in the scope equivalent to the Claims. In the following description, the same or equivalent components in description of the drawings are designated by the same reference signs, and the duplicated description is omitted.

Figure 2:
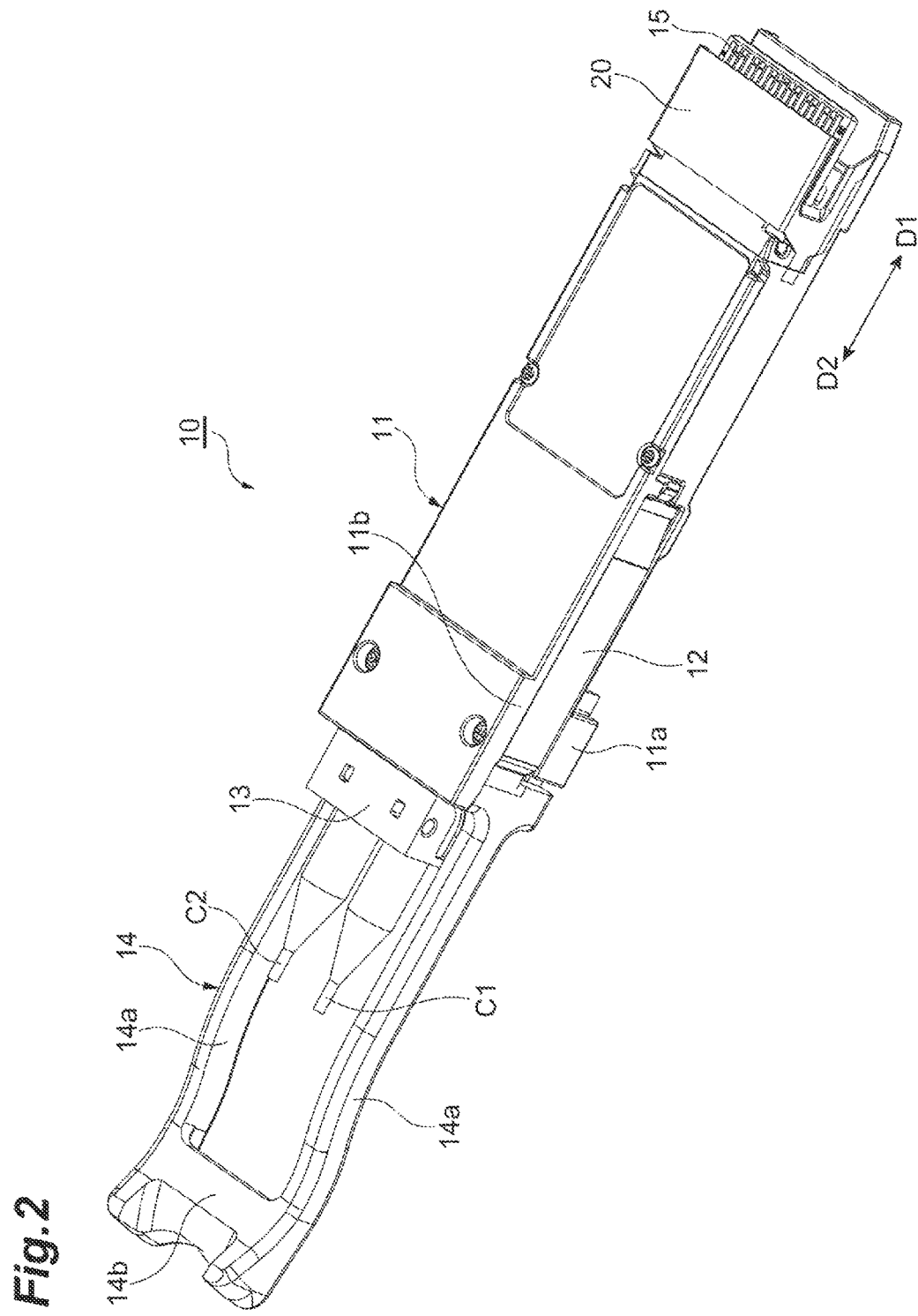
FIG. 2 is a perspective view of the optical transceiver in FIG. 1 seen in a direction different from in FIG. 1.

FIG. 1 is a perspective view illustrating an optical transceiver 10 according to an embodiment of the present invention. FIG. 2 is a perspective view of the optical transceiver 10 seen from an opposite side. The optical transceiver 10 is an optical transceiver complying with the QSFP (Quad Small Form-factor Pluggable) standard, for example, and performs full-duplex bidirectional optical communication. The optical transceiver 10 is inserted into and extracted from a cage 2 (see FIG. 12) of a host system (electronic apparatus) 1 for use. The optical transceiver 10 is pluggable into the host system 1. The optical transceiver 10 is a so-called pluggable transceiver, specifically, is a hot pluggable transceiver which has a form capable of activation without disconnecting a power of a host system (electronic apparatus) 1.

As illustrated in FIG. 1 and FIG. 2, the optical transceiver 10 includes a housing 11, a slider 12, and optical receptacle 13, and a pull-tab 14. The housing 11 is a metal housing having a roughly-rectangular parallelepiped shape capable of being inserted into and extracted from (namely, pluggable into) the cage 2. The roughly-rectangular parallelepiped shape extends in the insertion direction D1 or in the extraction direction D2, and thereby the housing 11 is pluggable into the cage 2. The slider 12 is provided in a pair and is provided to be slidable with respect to the housing 11. The optical receptacle 13 is located on an end of the housing 11. The pull-tab 14 extends out of the housing 11 toward a side opposite to the cage 2. The shape of the housing 11 extends along an insertion direction D1 of the optical transceiver 10 with respect to the cage 2. In the housing 11, an optical subassembly, an electronic circuit, and the like are housed. Examples of an optical subassembly include a TOSA (Transmitter Optical Sub-Assembly) and a ROSA (Receiver Optical Sub-Assembly). The housing 11 includes a lower housing 11a and an upper housing 11b. The slider 12 is attached to the lower housing 11a. The upper housing 11b is positioned opposite the lower housing 11a with the slider 12 being interposed therebetween. The slider 12 is provided on each of both lateral sides of the housing 11. The slider 12 serves as a mechanism which engages the cage 2 of the host system 1 with the optical transceiver 10 and releases the engaged state. The optical transceiver 10 in a state of being engaged with the cage 2 cannot be easily extracted even if the housing 11 is directly grasped to be extracted, for example. As described later, the engaged state is released by holding and extracting the pull-tab 14 so that the optical transceiver 10 can be extracted.

The optical receptacle 13 is provided on an end of the housing 11 in an extraction direction D2. The extraction direction D2 is a direction opposite to the insertion direction D1. Optical connectors C3 and C4 are inserted into and extracted from the optical receptacle 13. The optical connectors C3 and C4 are provided on tips of two optical fiber cables C1 and C2, respectively. The optical fiber cable C1 is a transmission optical fiber cable used for the optical transceiver 10 to transmit an optical signal, and the optical fiber cable C2 is a reception optical fiber cable used for the optical transceiver 10 to receive the optical signal. The electronic circuit inside the housing 11, and the optical fiber cables C1 and C2 become communicable with each other by inserting the optical connectors C3 and C4 into the optical receptacle 13. The optical connectors C3 and C4, and the optical receptacle 13 respectively have shapes conforming to a LC type optical connector, for example. In FIG. 1 to FIG. 4, each of the optical fiber cables C1 and C2 actually extends in the extraction direction D2, but its extending state is not illustrated in the figure.

The pull-tab 14 is made of resin and is composed of flexible materials. The pull-tab 14 has a pair of arms 14a and an coupling part 14b. The arms 14a extend out of the end of the housing 11 in the extraction direction D2. The coupling part 14b couples tips of the arms 14a with each other. The arms 14a is movable in coordination with the sliders 12. When the arms 14a are extracted in the extraction direction D2 by pulling the pull-tab 14, the sliders 12 move in the extraction direction D2. The engaged state between the cage 2 and the optical transceiver 10 is released as the sliders 12 move in the extraction direction D2. At this time, as described above, the engaged state is released by grasping the alms 14a to pull in the extraction direction D2. A mechanism for the engagement of the optical transceiver 10 with the cage 2 is described later.

Figure 3:
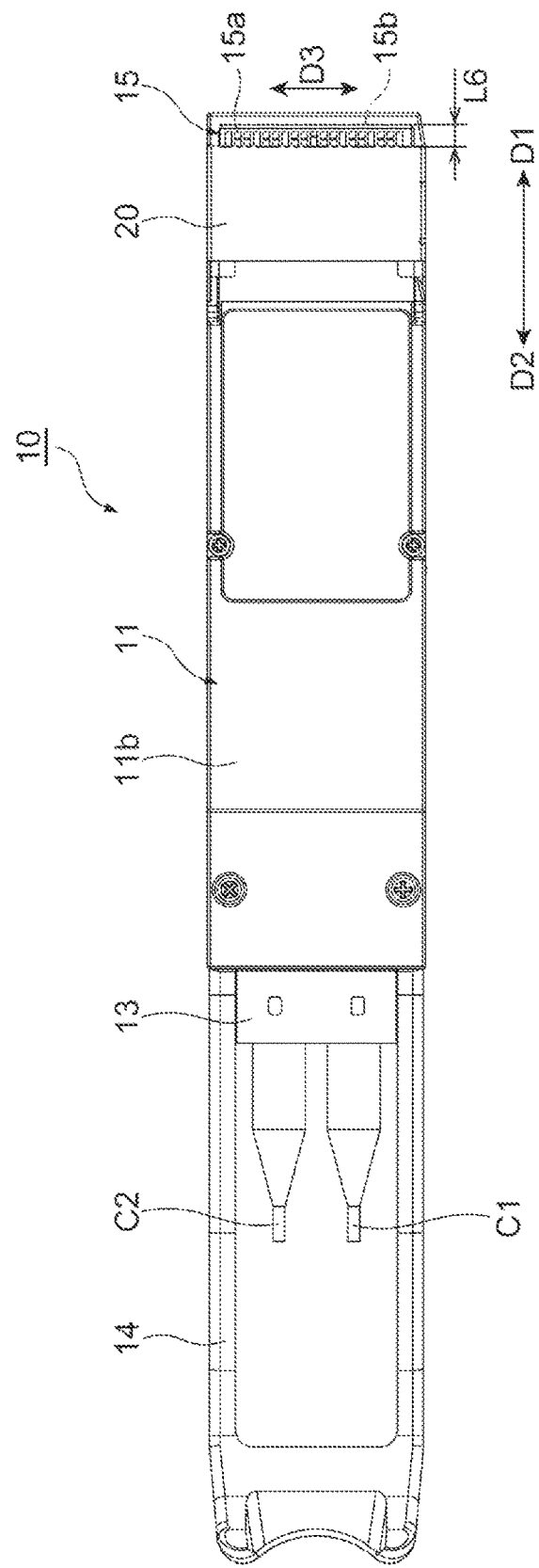
FIG. 3 is a bottom view illustrating the optical transceiver in FIG. 1.
Figure 4:
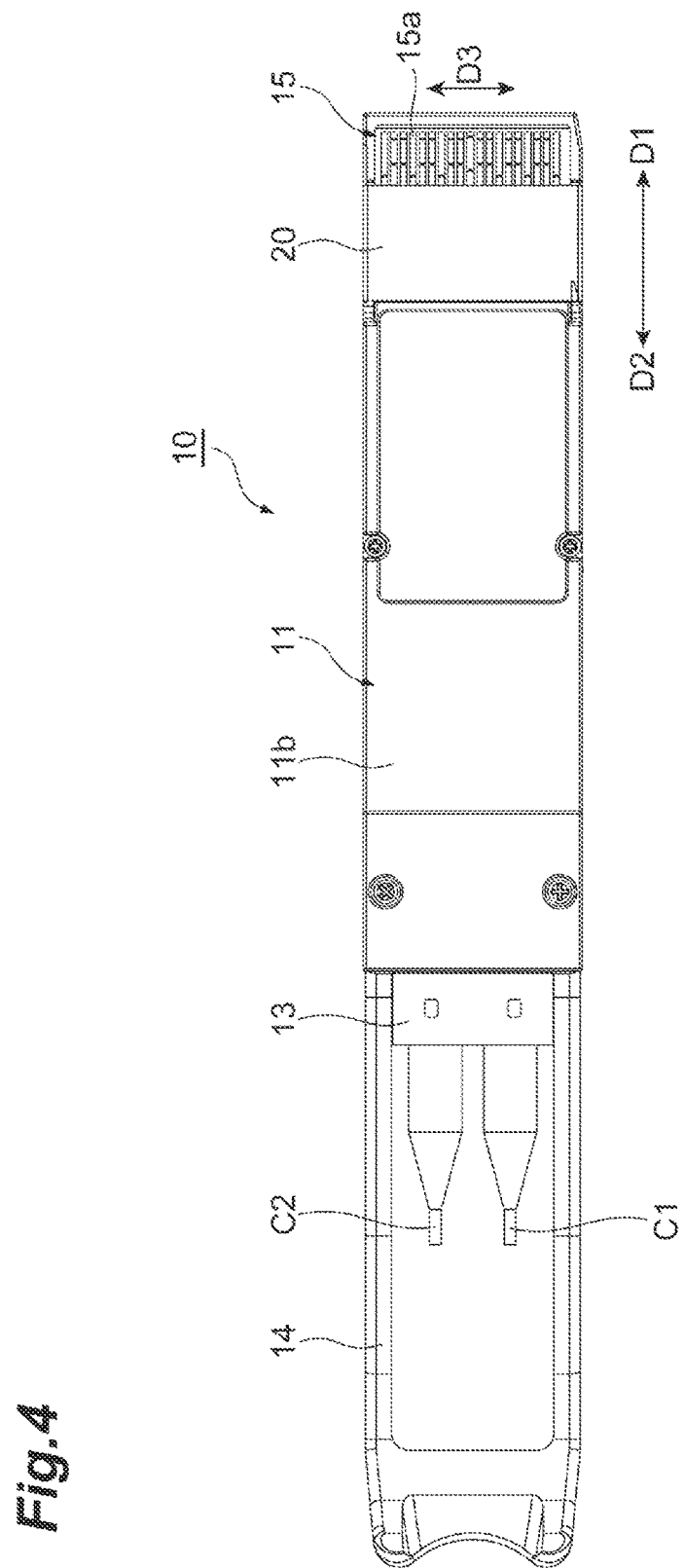
FIG. 4 is a bottom view illustrating the optical transceiver in which a cover moves with respect to a housing.

FIG. 3 is a bottom view of the optical transceiver 10 not inserted into the cage 2. FIG. 4 is a bottom view of the optical transceiver 10 fully inserted into the cage 2. As illustrated in FIG. 3 and FIG. 4, an end of the housing 11 on the cage 2 side is provided with the electrical plug 15 (see FIG. 12 regarding the cage 2). When the housing 11 is fully inserted into the cage 2 by pushing the pull-tab 14, the optical transceiver 10 is supplied with electric power required for an operation from the host system (electronic device) 1 through the electrical plug 15, and performs electrical communication with the electronic circuit inside the host system (electronic device) 1. Here, "fully inserted" means "inserted so that the electrical plug 15 mates with the host connector 5 and the housing 11 can not move forward any more in the insertion direction D1". The electrical plug 15 configures an electrical interface for the optical transceiver 10 to electrically communicate with the host system (electronic device) 1. The electrical plug 15 has a plurality of terminals 15a. The terminals 15a include a power electrode, a ground electrode, and a signal electrode. The terminals 15a are arranged along the insertion direction D1 and arranged along a width direction D3 of the optical transceiver 10. The width direction D3 is perpendicular to the insertion direction D1 and the extraction direction D2. In other words, the terminals 15a are two-dimensionally arranged on one plane including the insertion direction D1 (or, the extraction direction D2) and the width direction D3. When the optical transceiver 10 is inserted in to the cage 2, the electrical plug 15 mates with a host connector (electrical connector) 5 (see FIG. 12) which is provided at the back of the cage 2. The electrical plug 15 mating with the host connector 5 allows the terminals of the electrical plug 15 and terminals of the host connector 5 to be electrically connected, which enables the optical transceiver 10 and the host system (electronic device) 1 to communicate with each other. An electrical connection between the electrical plug 15 and the host connector 5 also enables the power supply from the host system 1 to the optical transceiver 10. In the following description, in a state where the optical transceiver is inserted into the cage 2, an orientation expressed by "on the cage 2 side" or "closer to the cage 2 than" represents an orientation toward "the host connector side".

The optical transceiver 10 further includes a cover 20 covering the electrical plug 15. The cover 20 is a movable cover moving with respect to the housing 11. Here, a phrase "covering the electrical plug" represents hiding at least a part of the electrical plug from the outside, and includes both a case of covering entirely the electrical plug and a case of covering a part of the electrical plug. The case of covering a part of the electrical plug means a state the same as a case where the rest of the relevant part of the electrical plug is exposed. It is important in covering the electrical plug to cover the relevant terminals in order to protect the terminals of the electrical plug as described above, and other than the terminals of the electrical plug (e.g., a surrounding portion of the terminals) may not be covered. The cover 20 is configured to be slidable in the insertion direction D1 (or, pluggable direction) and extraction direction D2 with respect to the housing 11.

When the housing 11 is not inserted into the cage 2, the cover 20 is positioned on a side toward the insertion direction D1 to cover the electrical plug 15. On the other hand, when the housing 11 is inserted into the cage 2, the cover 20 moves toward the extraction direction D2 to expose the electrical plug 15. The electrical plug 15 may have an area 15b not covered by the cover 20 at a part thereof on the side toward the insertion direction D1. A length L6 of the area 15b in the insertion direction D1 is 2 mm or more and 3 mm or less, for example. The area 15b not covered by the cover 20 restrains more reliably the cover 20 from catching on in the insertion and extraction (inserting and extracting) of the optical transceiver 10. By restraining the catching on, failures caused by deformation of the cage 2, the cover 20 or the like can be prevented, and reliability of the host system (electronic device) 1 can be improved. However, the electrical plug 15 may not have the area 15b. Specifically, the cover 20 may cover entirely the electrical plug 15, or may slightly project on the side toward the insertion direction D1 of the electrical plug 15 when covering the electrical plug 15.

Figure 5:
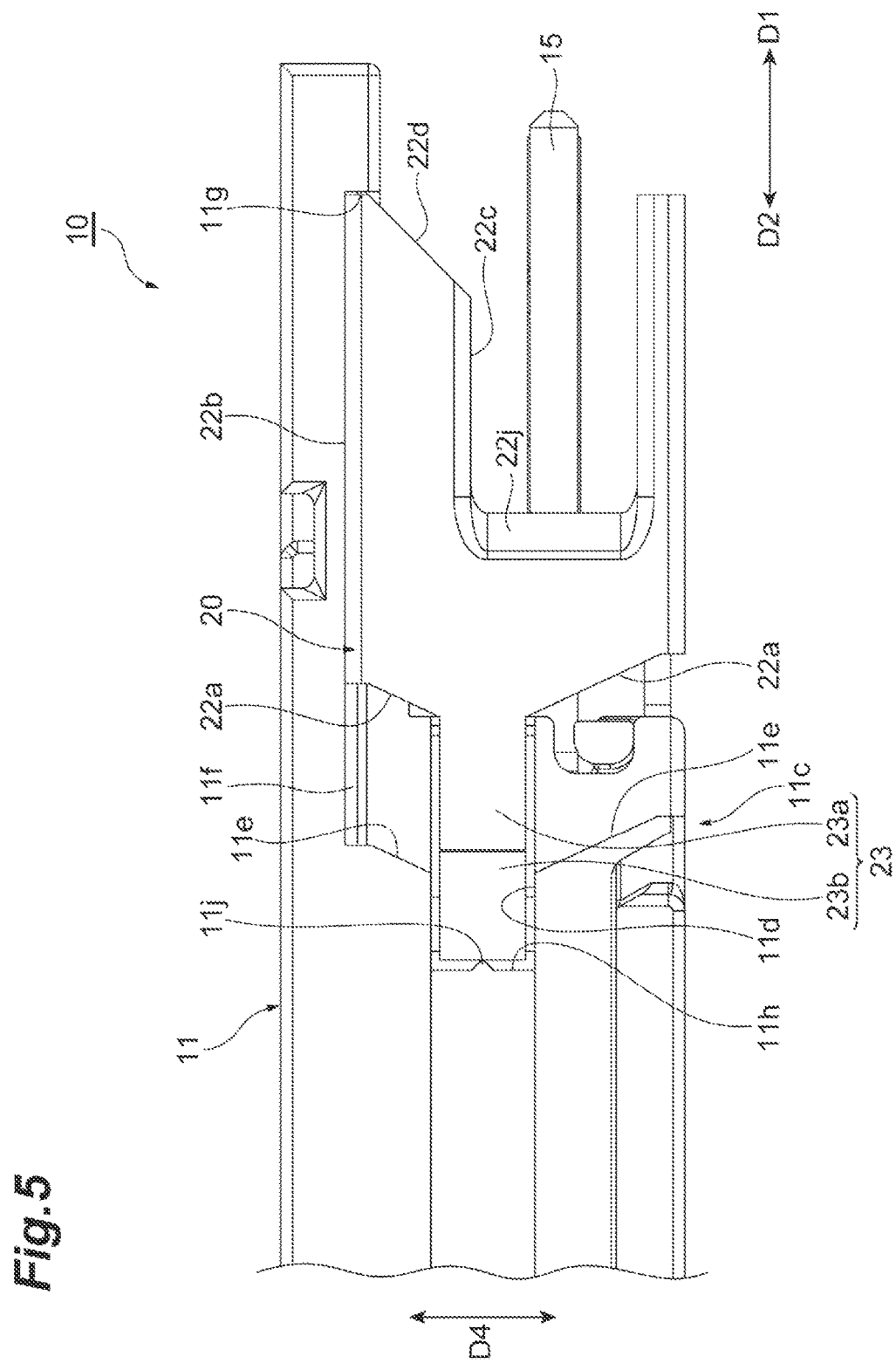
FIG. 5 is a lateral view illustrating an electrical plug and the cover of the optical transceiver in FIG. 3.
Figure 6:
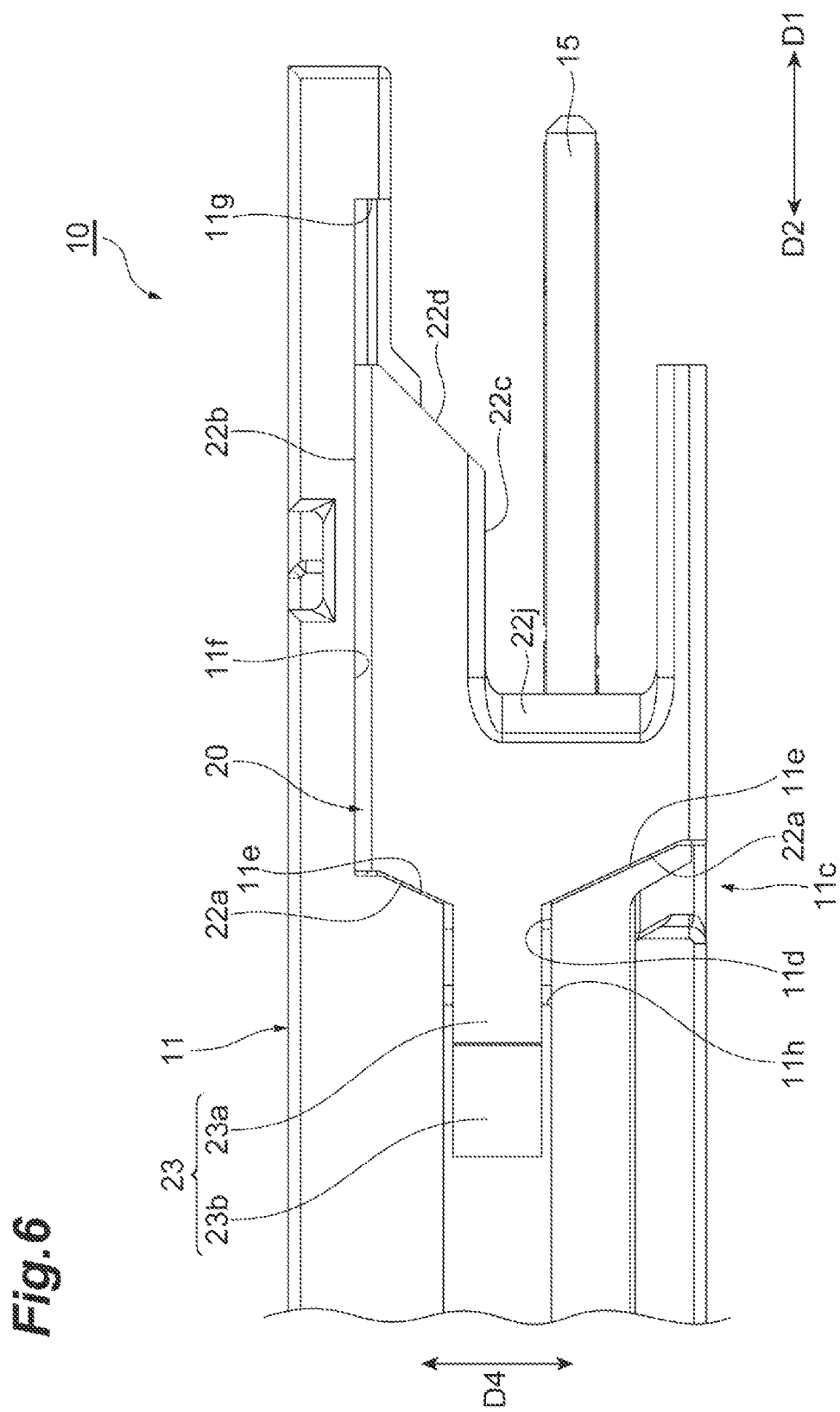
FIG. 6 is a lateral view illustrating the electrical plug and the cover of the optical transceiver in FIG. 4.

FIG. 5 is a diagram illustrating a lateral side of the optical transceiver 10 not inserted into the cage 2. FIG. 6 is a diagram illustrating a lateral side of the optical transceiver 10 fully inserted into the cage 2. As illustrated in FIG. 5 and FIG. 6, the housing 11 has a groove 11d, a first stopper 11e, a slide part 11f, and a second stopper 11g. The groove 11d extends from an end part 11c of the housing 11 on the cage 2 side (on the side toward the insertion direction D1) to a pull-tab side (the side toward the extraction direction D2). The first stopper 11e is a part including a pair of upper and lower parts positioned closer to the cage 2 than the groove 11d. The slide part 11f extends from the first stopper 11e on the upper side (of the housing 11 as shown in FIG. 5 and FIG. 6) toward the insertion direction D1. The second stopper 11g is positioned closer to the cage 2 than the slide part 11f.

The groove 11d is provided at a middle portion of the optical transceiver 10 in a height direction D4, and straight extends from the first stopper 11e toward the slider 12. The height direction D4 is perpendicular to each of the width direction D3 and the insertion direction D1 (or the extraction direction D2). The groove 11d is provided with a step part 11h, and a depth of the groove 11d at the step part 11h closer to the cage 2 is deeper than a groove depth of the groove 11d at the step part 11h closer to the slider 12. Here, the depth of the groove 11d represents a length from the outside toward the inside of the optical transceiver 10 along the width direction D3, for example. The step part 11h has a plate-like protrusion 11j formed thereon protruding toward the insertion direction D1. The protrusion 11j is described later.

The first stopper 11e is a part with which the cover 20 is brought into contact, the cover 20 relatively moving in the extraction direction D2 by being pushed by the host connector 5, as described in detail later, when the optical transceiver 10 is pushed into the cage 2 along the insertion direction D1. The first stopper 11e is inclined relatively to the height direction D4, and for example, the farther from the groove 11d toward the upper side of the first stopper, the closer to the cage 2. For example, an inclined angle of the first stopper 11e with respect to the insertion direction D1 is an acute angle (here, the insertion direction D1 is assumed to be 0° and the extraction direction D2 is assumed to be 180°). The slide part 11f is an area where the cover 20 is slidable in the insertion direction D1 and the extraction direction D2. In other words, the cover 20 slides along the slide part 11f in the insertion direction D1 and the extraction direction D2. The second stopper 11g is a part which is provided on an end of the slide part 11f on the side toward the insertion direction D1 (on the cage 2 side) and protrudes downward with respect to the slide part 11f. The housing 11 having the first stopper 11e and the second stopper 11g allows the cover 20 move in a range of a length of the slide part 11f. Specifically, the first stopper 11e restrains the cover 20 from moving in the extraction direction D2 beyond necessity, and the second stopper 11g restrains the cover 20 from moving in the insertion direction D1 beyond necessity. The groove 11d, the first stopper 11e, the slide part 11f, and the second stopper 11g are respectively provided to be paired in the width direction D3 in the housing 11.

Figure 7:
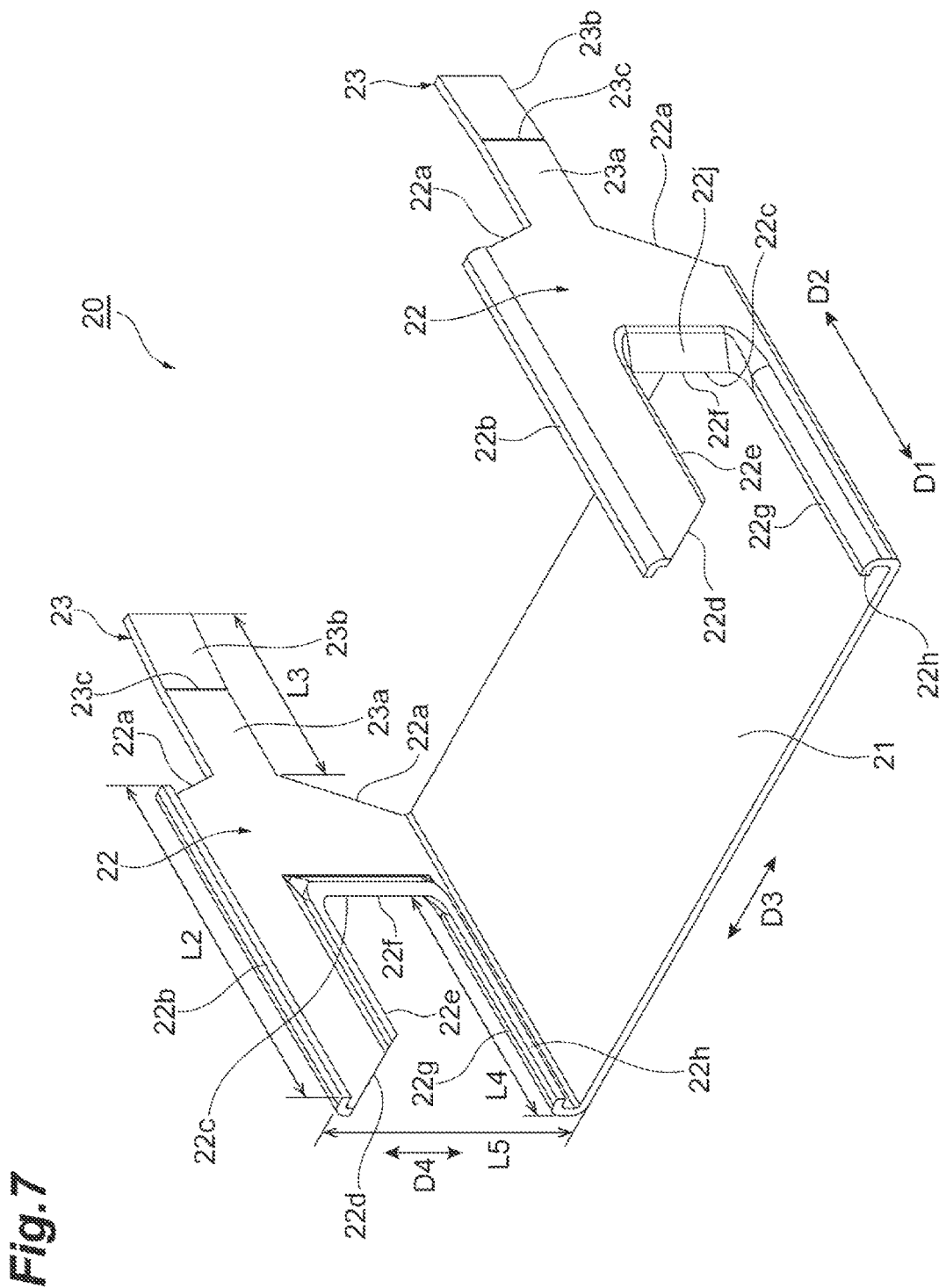
FIG. 7 is a perspective view enlargedly illustrating the cover.
Figure 8:
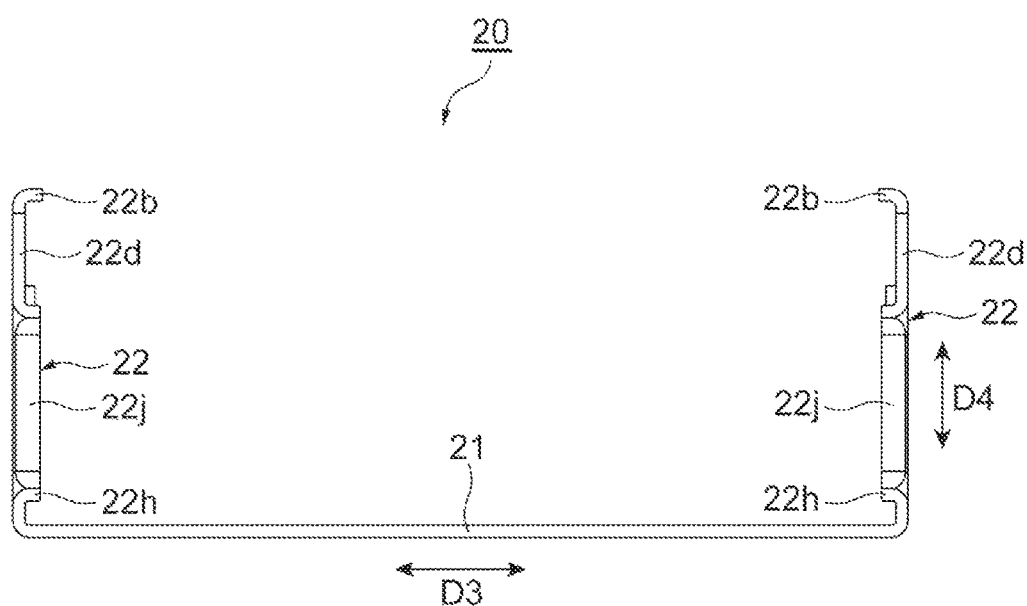
FIG. 8 is a front view illustrating the cover in FIG. 7.
Figure 9:
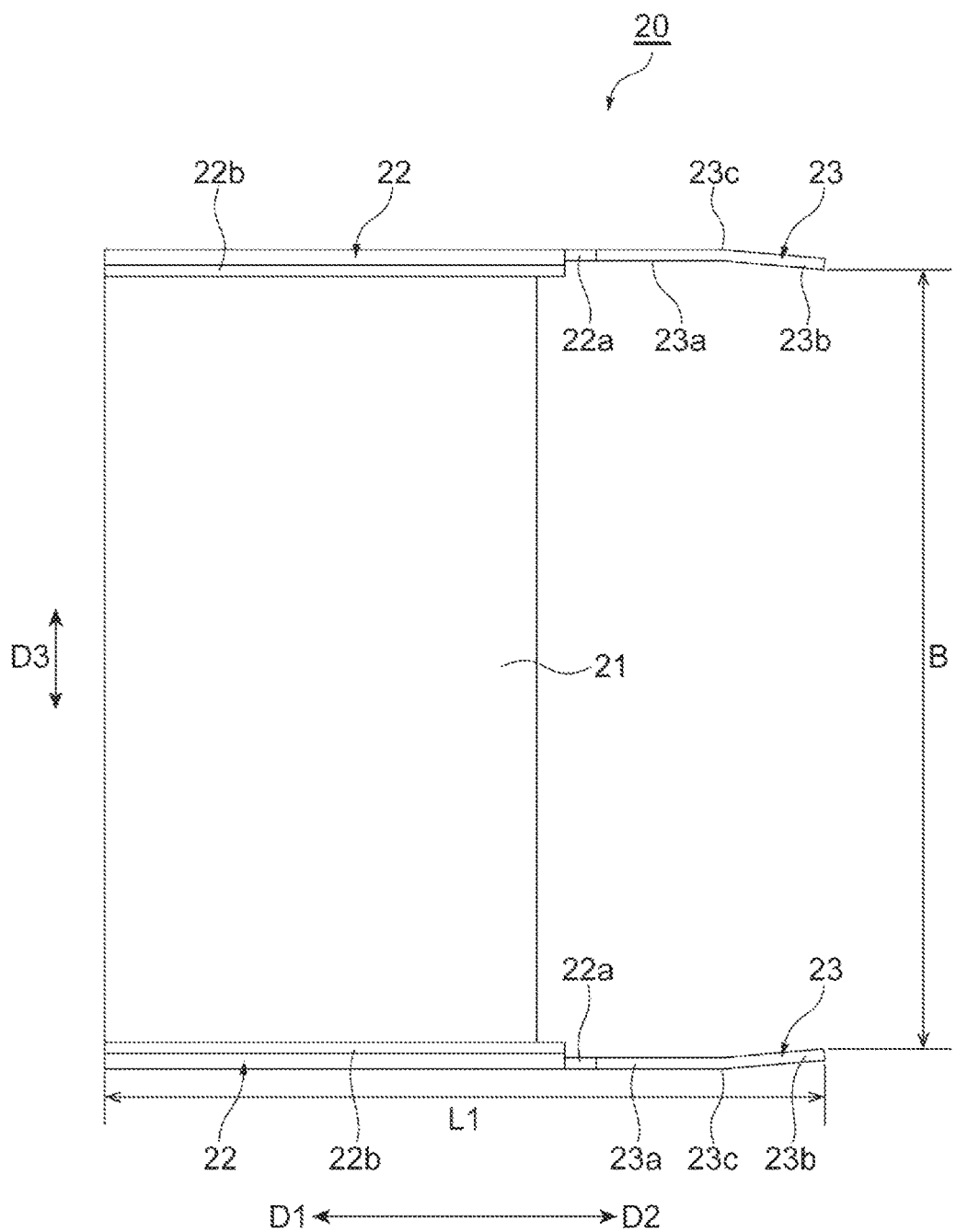
FIG. 9 is a plan view illustrating the cover in FIG. 7.

FIG. 7 is a perspective view illustrating the cover 20. FIG. 8 is a front view of the cover 20 seen from the insertion direction D1. FIG. 9 is a plan view of the cover 20 seen from the height direction D4. As illustrated in FIG. 7 to FIG. 9, the cover 20 is, for example, a part made of a metal plate that is formed by cutting work or bending work of the metal plate. The cover 20 includes a cover body 21, cover uprights 22, and a cover tab 23. The cover body 21 covers a part or all of the electrical plug 15. The cover uprights 22 are erected in the height direction D4 from both ends of the cover body 21 in the width direction D3. The cover tab 23 extends from the cover uprights 22 in the extraction direction D2.

The cover body 21 is a flat plate and is a part covering the electrical plug 15 from a lower side (the side opposite to the lower housing 11a). An angle foiled by the cover body 21 and the cover upright 22 is 90°, for example, but may be equal to or less than 90°. In this case, a contact pressure by the cover 20 to the housing 11 can be increased by making a distance between end edges of the cover uprights 22 be less than a width of cover body 21. Each cover upright 22 has a contact part 22a bought into contact with the first stopper 11e when the cover 20 moves relative to the housing 11 in the extraction direction D2. The contact part 22a is inclined relatively to the height direction D4 similarly to the first stopper 11e, and the farther from the cover tab 23 toward the height direction D4, the more inclined to the side toward the insertion direction D1 (the closer to the cage 2). For example, an inclined angle of the contact part 22a with respect to the insertion direction D1 is the same as the inclined angle of the first stopper 11e with respect to the insertion direction D1. For this reason, the contact part 22a can contact with the first stopper 11e on a plane basis. The cover upright 22 has a bent part 22b on an end (upper end) thereof in the height direction D4, the bent part 22b getting into the inside of the cover 20. The bent part 22b is a part getting into the slide part 11f of the housing 11 to guide the cover 20 in the insertion direction D1 and extraction direction D2 along the slide part 11f.

The cover upright 22 has a hollow 22c and tapered part 22d. The hollow 22c extends from the end on the cage 2 side in the extraction direction D2. The closer to the center in the height direction D4 from the end on the cage 2 side (of the taped part 22d), the more inclined to the side toward the extraction direction D2 (the closer to the slider 12) the tapered part 22d is. The hollow 22c is defined by a first side 22e, a second side 22f, and a third side 22g. The first side 22e extends from the tapered part 22d in the extraction direction D2. The second side 22f extends from an end of the first side 22e on the side toward the extraction direction D2 in the height direction D4. The third side 22g extents from an end of the second side 22f opposite to the first side 22e along the cover body 21.

A shape defined by the first side 22e, the second side 22f, and the third side 22g is a rectangle and the hollow 22c is a rectangular slot. The third side 22g has a bent part 22h bent toward the inside of the cover 20. The second side 22f has a slope surface 22j inclined toward the inside of the cover 20 in the width direction D3. The tapered part 22d is an edge face inclined in the insertion direction D1, the extraction direction D2, and the height direction D4, and the closer to the upper end of the tapered part 22d, the more inclined to the side toward the insertion direction D1 (the closer to the cage 2).

The cover tab 23 further extends out of an end of the contact part 22a on the slider 12 side in the extraction direction D2. The cover tab 23 extends in the extraction direction D2 with respect to the cover body 21. The cover tab 23 is slidable along the groove 11d of the housing 11. The cover tab 23 is a plate like member. The cover tab 23 has a base end part 23a and a tip end part 23b. The base end part 23a extends out of the cover upright 22 in the extraction direction D2. The tip end part 23b is bent from an end of the base end part 23a on the slider 12 side toward the inside of the cover 20 in the width direction D3. The base end part 23a is continuous with the cover upright 22, and the tip end part 23b is continuous with the base end part 23a via a bending line 23c extending in the height direction D4. A pair of cover tabs 23 are provided in the width direction D3, and a width B between tip ends of a pair of tip end parts 23b is narrower than a width of the housing 11 (a length in the width direction D3). This allows a pair of cover tabs 23 to hold the housing 11 between both ends in the width direction D3 by an elastic force and slide along the groove 11d in a state of having an elastic friction force. Therefore, externally giving a force exceeding the static friction force causes the cover to slide along the groove 11d of the housing 11.

For example, a length L1 of the cover 20 in the insertion direction D1 is 16 mm, a length L2 of the bent part 22b in the insertion direction D1 is 12 mm, and a length L3 of the cover tab 23 in the insertion direction D1 is 4.0 mm. A length L4 of the hollow 22c in the insertion direction D1 is 6.7 mm, and a height L5 of cover 20 from the cover body 21 to the bent part 22b is 7.0 mm.

Figure 10:
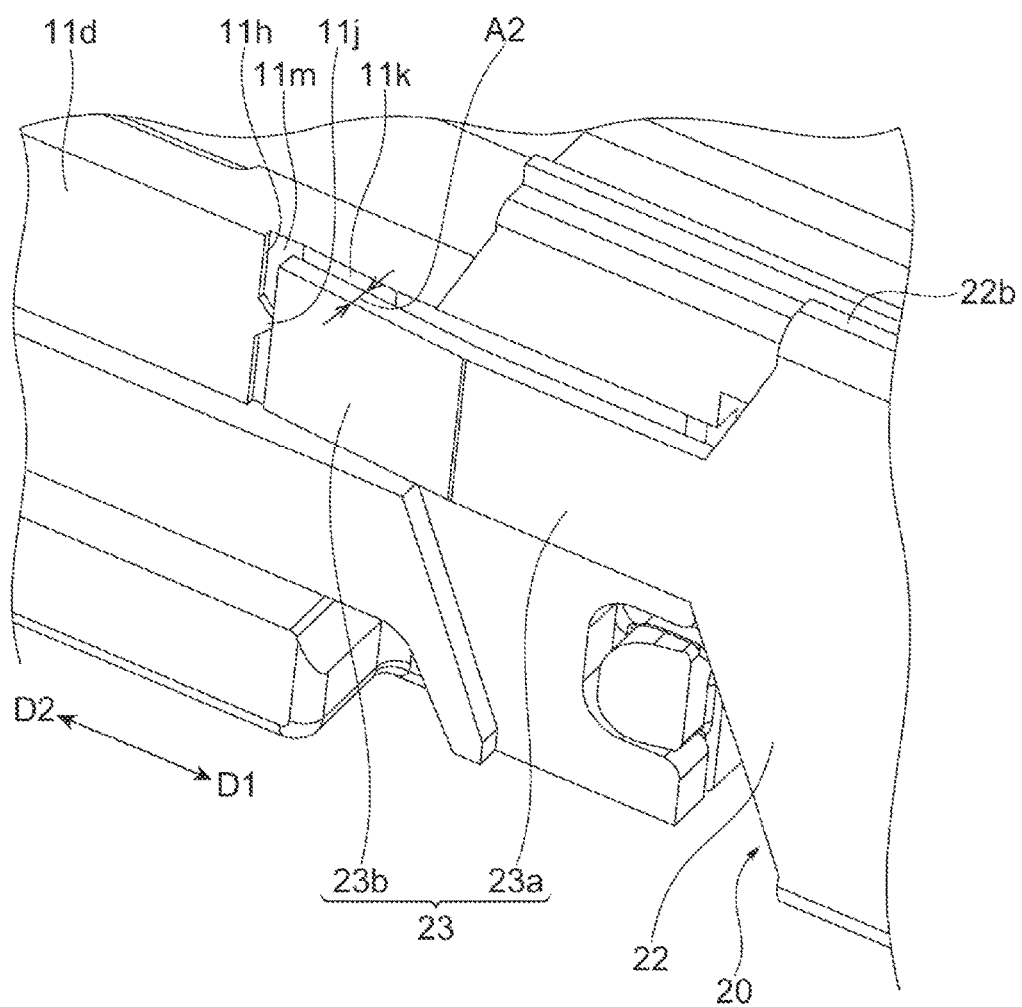
FIG. 10 is a perspective view enlargedly illustrating a contact portion of a cover tab of the cover in FIG. 7 and the housing.
Figure 11:
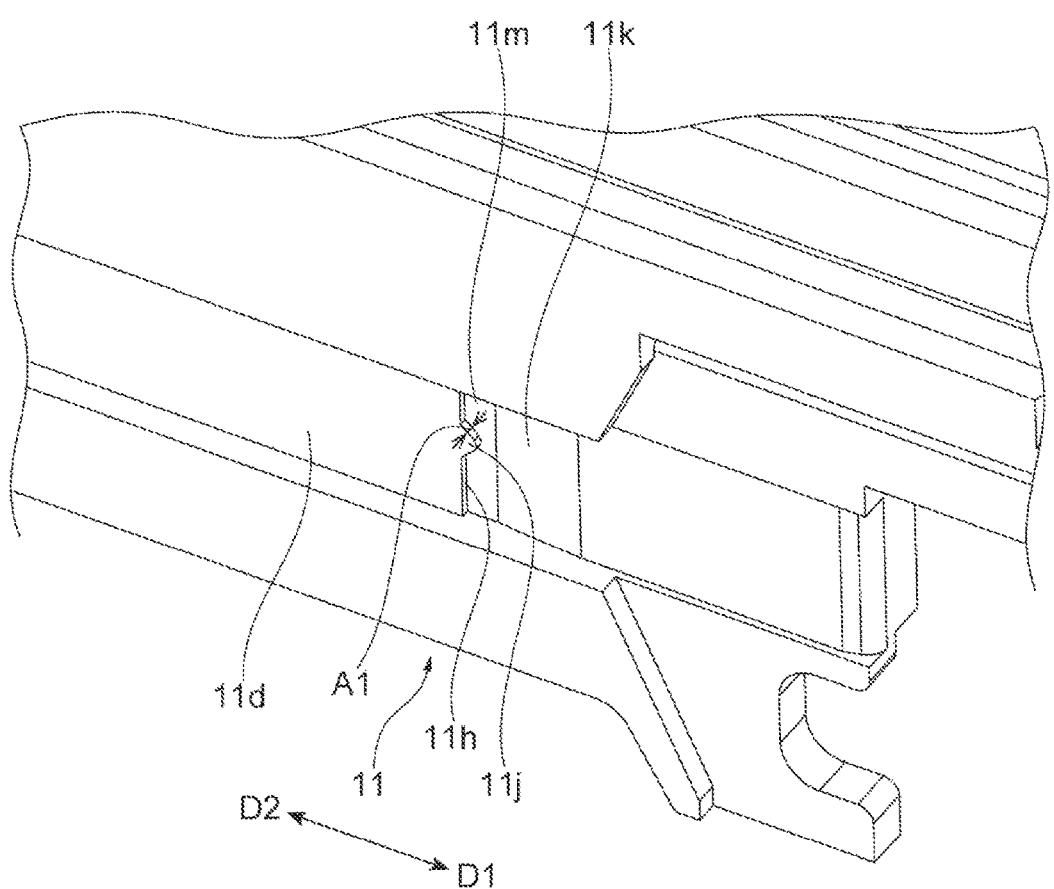
FIG. 11 is a perspective view illustrating a groove and a protrusion of the housing in FIG. 10.

FIG. 10 is a perspective view illustrating the cover tab 23, the groove 11d, and the protrusion 11j. FIG. 11 is a perspective view enlargedly illustrating the groove 11d and the protrusion 11j. The tip end part 23b of the cover tab 23 is in contact with the protrusion 11j of the groove 11d when the housing 11 is not inserted into the cage 2, and surmounts the protrusion 11j and moves relative to the housing 11 in the extraction direction D2 when the housing 11 is inserted into the cage 2. The cover tab 23, which does not surmount protrusion 11j so long as the housing 11 is not pushed to the side toward the insertion direction D1 with a certain force or more, can restrain the cover 20 from moving in the extraction direction D2 and keep the cover 20 covering the electrical plug 15. In other words, the protrusion 11j is a mechanism which locks the move of the cover 20 in the extraction direction D2 even if the housing 11 is pushed with a force less than a certain force to keep the state where the cover 20 covers the electrical plug 15. Therefore, even if a force is unintentionally applied to the housing 11 due to carelessness or the like, the relevant lock mechanism can restrain the cover 20 from moving in the extraction direction D2.

The protrusion 11j protrudes toward the insertion direction D1 in a chevron shape at the step part 11h of the groove 11d, and the cover tab 23 contacts at a point with the protrusion 11j. The groove 11d has a tapered surface 11k and a bottom surface 11m, and the protrusion 11j is formed on the bottom surface 11m. The tapered surface 11k is closer to the cage 2 than the step part 11h and inclined to the inside in the width direction D3. The bottom surface 11m extends from the tapered surface 11k toward the step part 11h (or is located between the tapered surface 11k and the step part 11h). A height A1 of the protrusion 11j (a thickness in the width direction D3) is a half of a plate thickness A2 of the cover tab 23, for example. Here, the "half" includes, for example, a case of a slight deviation from the half such as approximately a half and substantially a half. The height A1 of the protrusion 11j may be 25% or more and 75% or less of the plate thickness A2 of the cover tab 23. The height A1 of the protrusion 11j and the plate thickness A2 of the cover tab 23 are adjusted in this way so that it is possible to adequately change a force needed when the cover tab 23 surmounts the protrusion 11j and release the lock mechanism of the protrusion 11j. Alternatively, the height A1 of the protrusion 11j may be set relative to the plate thickness A2 of the cover tab 23 depending on the force needed when the cover tab 23 surmounts the protrusion 11j and thereby release the lock mechanism of the protrusion 11j.

Figure 12:
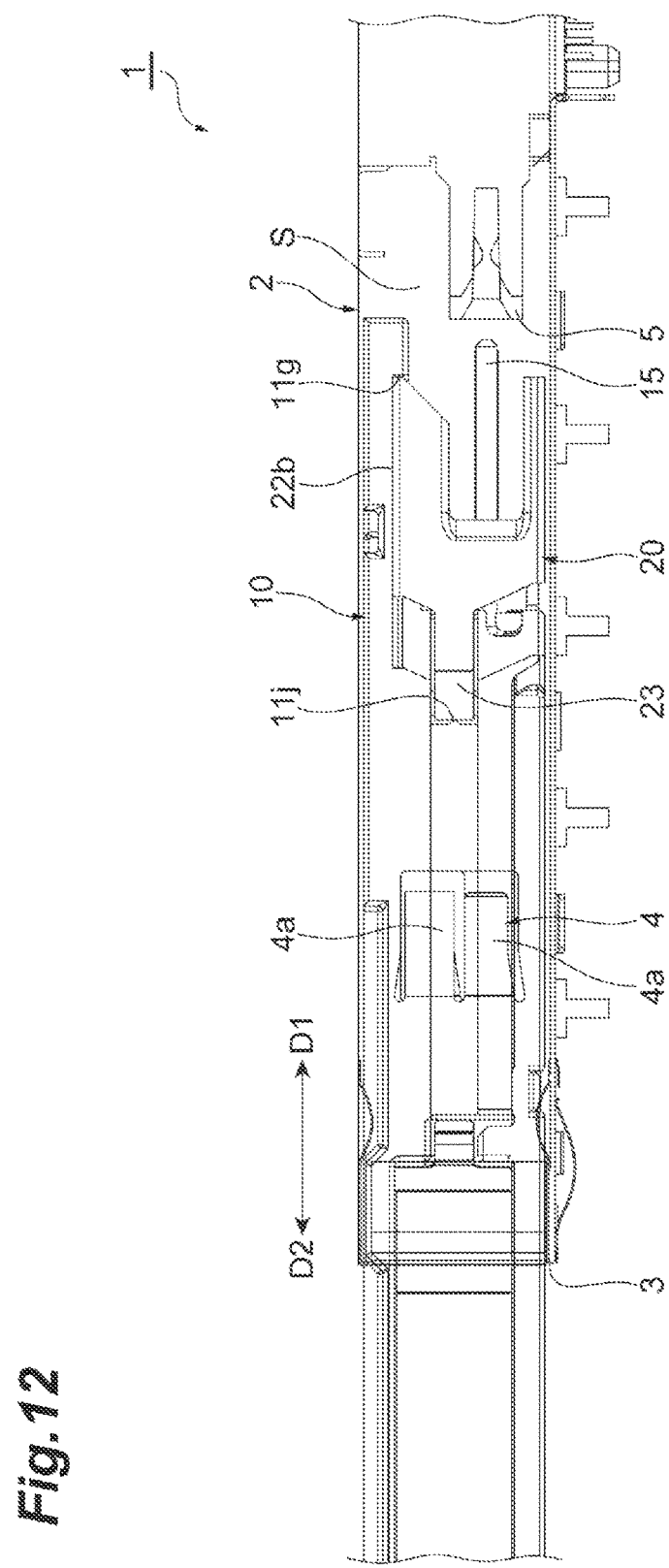
FIG. 12 is a lateral view illustrating a procedure for inserting the optical transceiver in FIG. 1 into a cage.

Next, a description is given of operations of the parts of the optical transceiver 10 when the optical transceiver 10 is inserted into and extracted from the cage 2 of the host system (electronic device) 1 referring to FIG. 12 to FIG. 22. As illustrated in FIG. 12, the cage 2 has an internal space S which an end of the optical transceiver 10 on the cage 2 side enters. The cage 2 has a roughly-rectangular parallelepiped shape, which extends in the insertion direction D1, and a cavity (internal space) into which the optical transceiver 10 is inserted. The cage 2 includes an opening 3, a cage tab 4, and a host connector (electrical connector) 5. The opening 3 is an inlet for the optical transceiver 10 to enter the internal space S. The cage tab 4 engages with the housing 11. The electrical connector 5 mates with the electrical plug 15. The cage tab 4 has a pair of upper and lower plate parts 4a. One of the two plate parts 4a is inclined to the internal space S side (inside), and the other of the two plate parts 4a is inclined to a side opposite to the internal space S (outside) (see FIG. 16). The host connector 5 is engaged with the electrical plug 15 of the optical transceiver 10 which is fully inserted into the internal space S. An electrical communication between the optical transceiver 10 and the host system 1 is achieved by the engagement of the electrical plug 15 with the host connector 5. The engagement of the electrical plug 15 with the host connector 5 can be performed in a state where the host system 1 can supply power to the optical transceiver 10 through the host connector 5.

First, a description is given of the operations of the parts when the optical transceiver 10 is inserted into the cage 2. As illustrated in FIG. 12, when the optical transceiver 10 is inserted into the internal space S from the opening 3 of the cage 2 in the insertion direction D1, the electrical plug 15 of the optical transceiver 10 faces the host connector 5. Since the cover tab 23 is in contact with the protrusion 11j before the electrical plug 15 engages with the host connector 5, the cover 20 keeps the electrical plug 15 in a state of being covered. The end of the bent part 22b of the cover 20 is in contact with the second stopper 11g.

Figure 13:
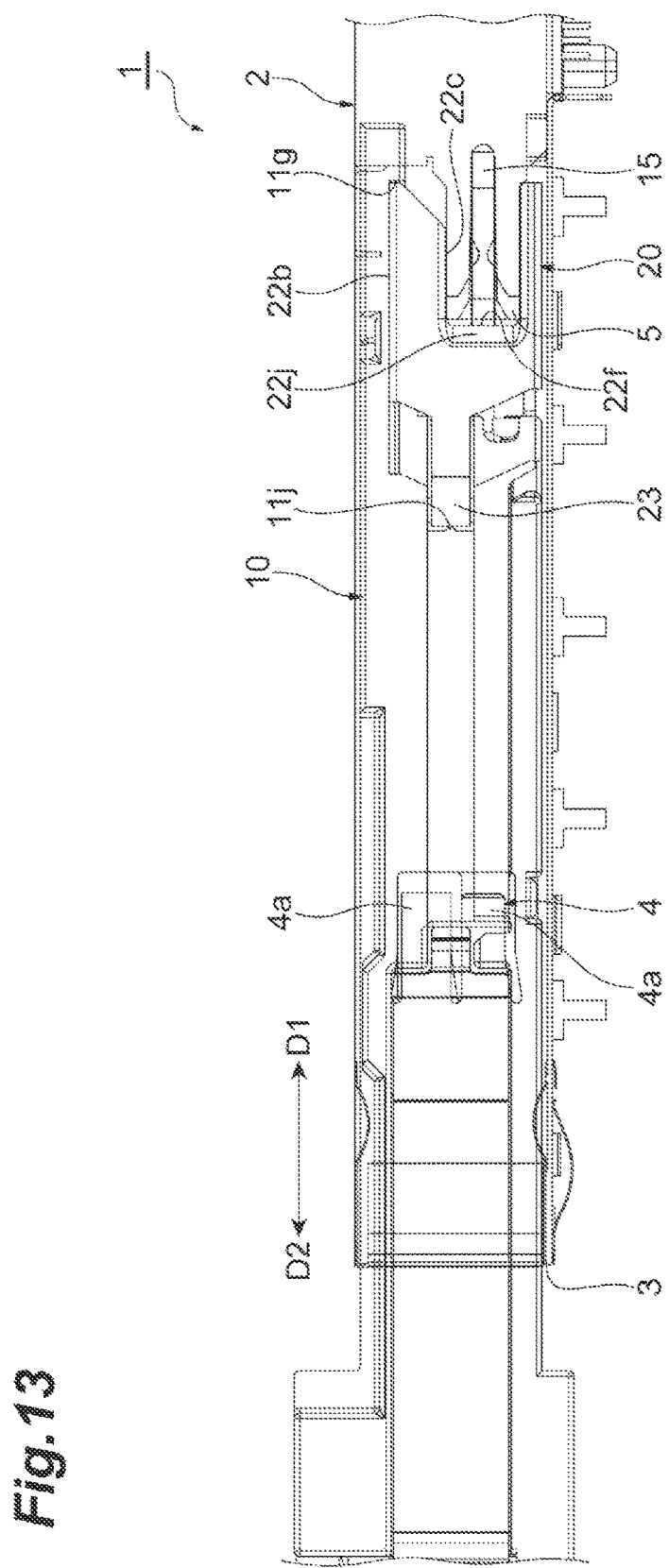
FIG. 13 is a lateral view of the optical transceiver and the cage illustrating the procedure in FIG. 12.
Figure 14:
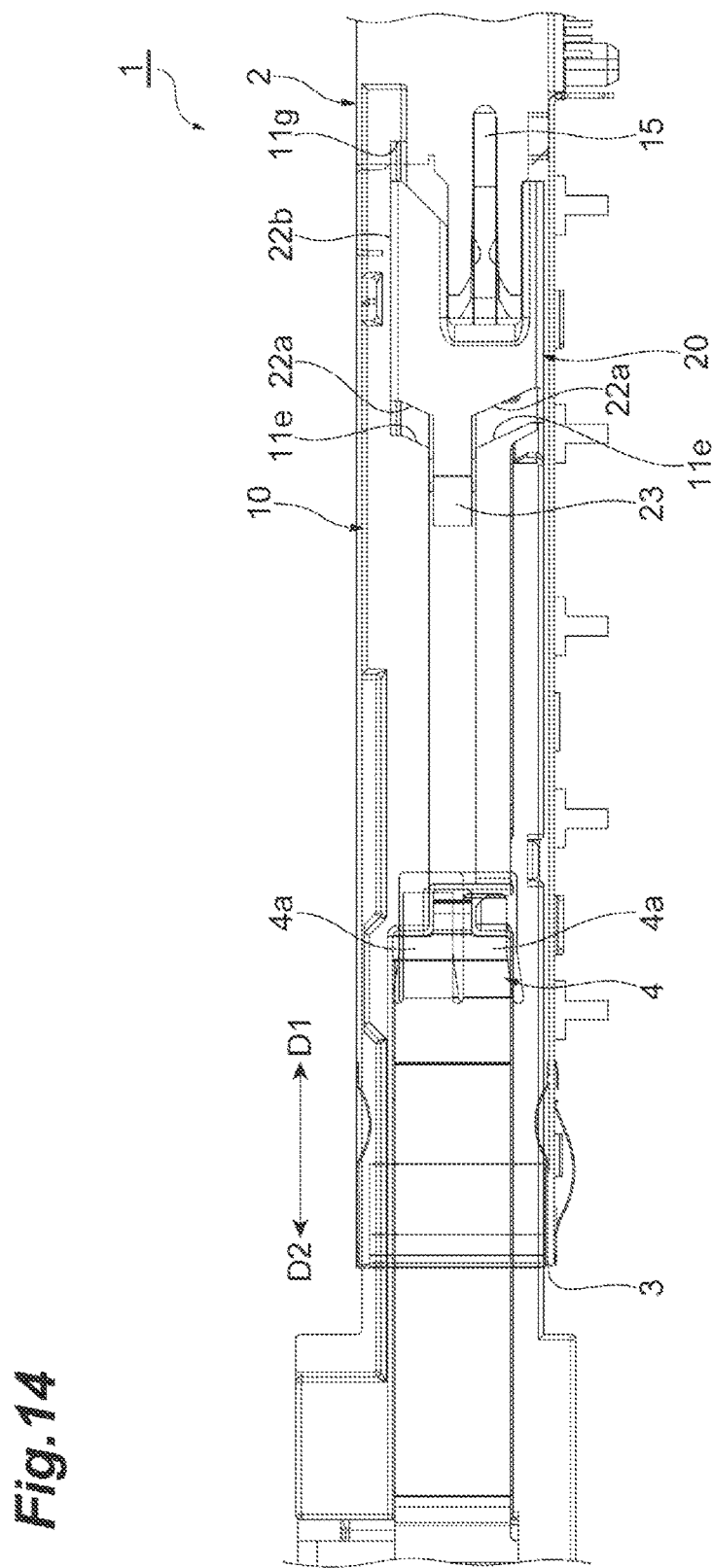
FIG. 14 is a lateral view of the optical transceiver and the cage illustrating the procedure in FIG. 13.

Next, as illustrated in FIG. 13, when the optical transceiver 10 is further pushed in the insertion direction D1, the electrical plug 15 engages with the host connector 5. At this time, the second side 22*f* (the slope surface 22*j*) of the hollow 22*c* of the cover 20 is brought into contact with the host connector 5 as well as the electrical plug 15 mates with the host connector 5. When the optical transceiver 10 is pushed in the insertion direction D1 with a certain or more force, the cover tab 23 surmounts the protrusion 11*j* in the extraction direction D2 and the cover 20 moves relatively toward the extraction direction D2 as illustrated in FIG. 14. At this time, the end of the bent part 22*b* departs from the second stopper 11*g* and slides in the extraction direction D2, and the cover 20 moves in the extraction direction D2 such that the electrical plug 15 starts exposing from the cover 20. In other words, an area of the electrical plug 15 covered by the cover 20 decreases, as the cover 20 moves in the extraction direction D2.

Figure 15:
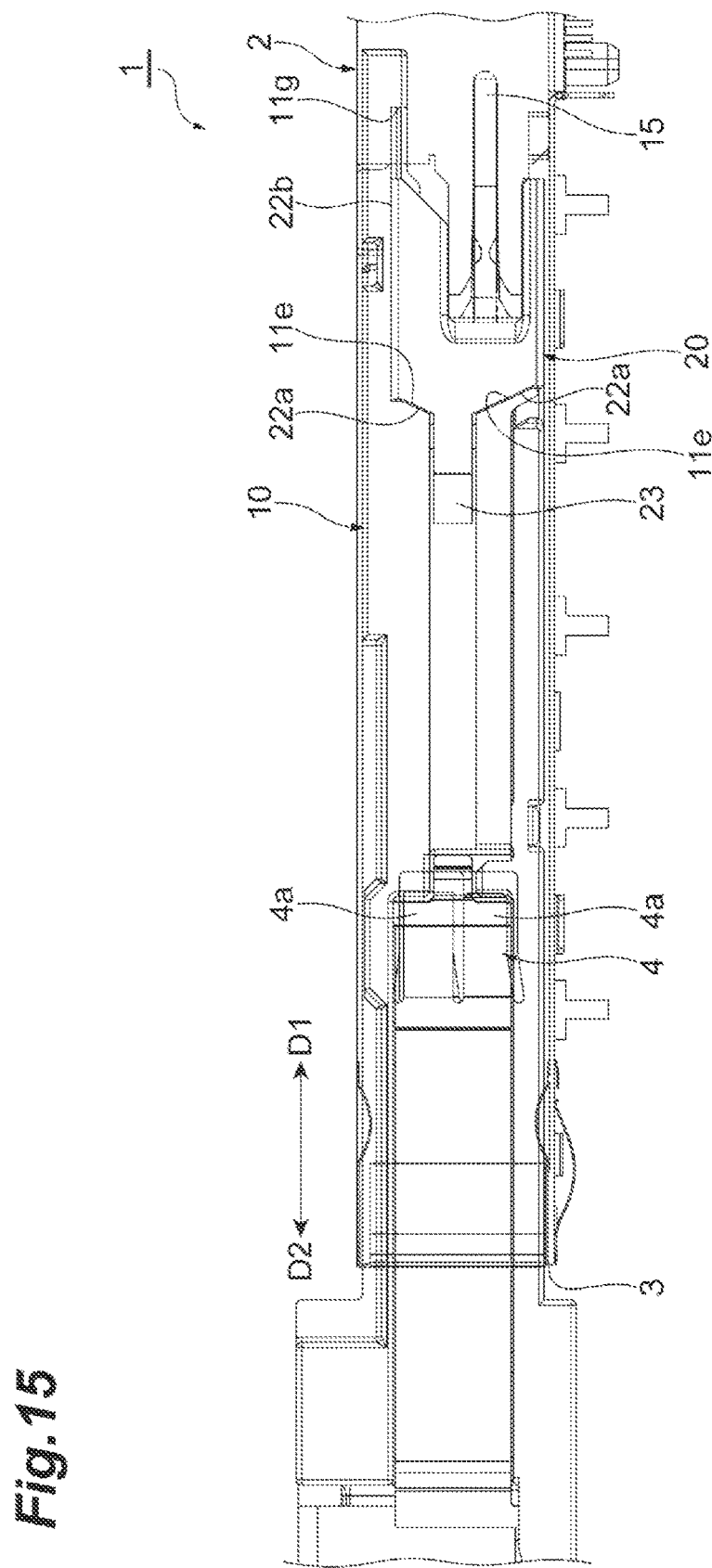
FIG. 15 is a lateral view illustrating the optical transceiver fully inserted into the cage in FIG. 14.
Figure 16:
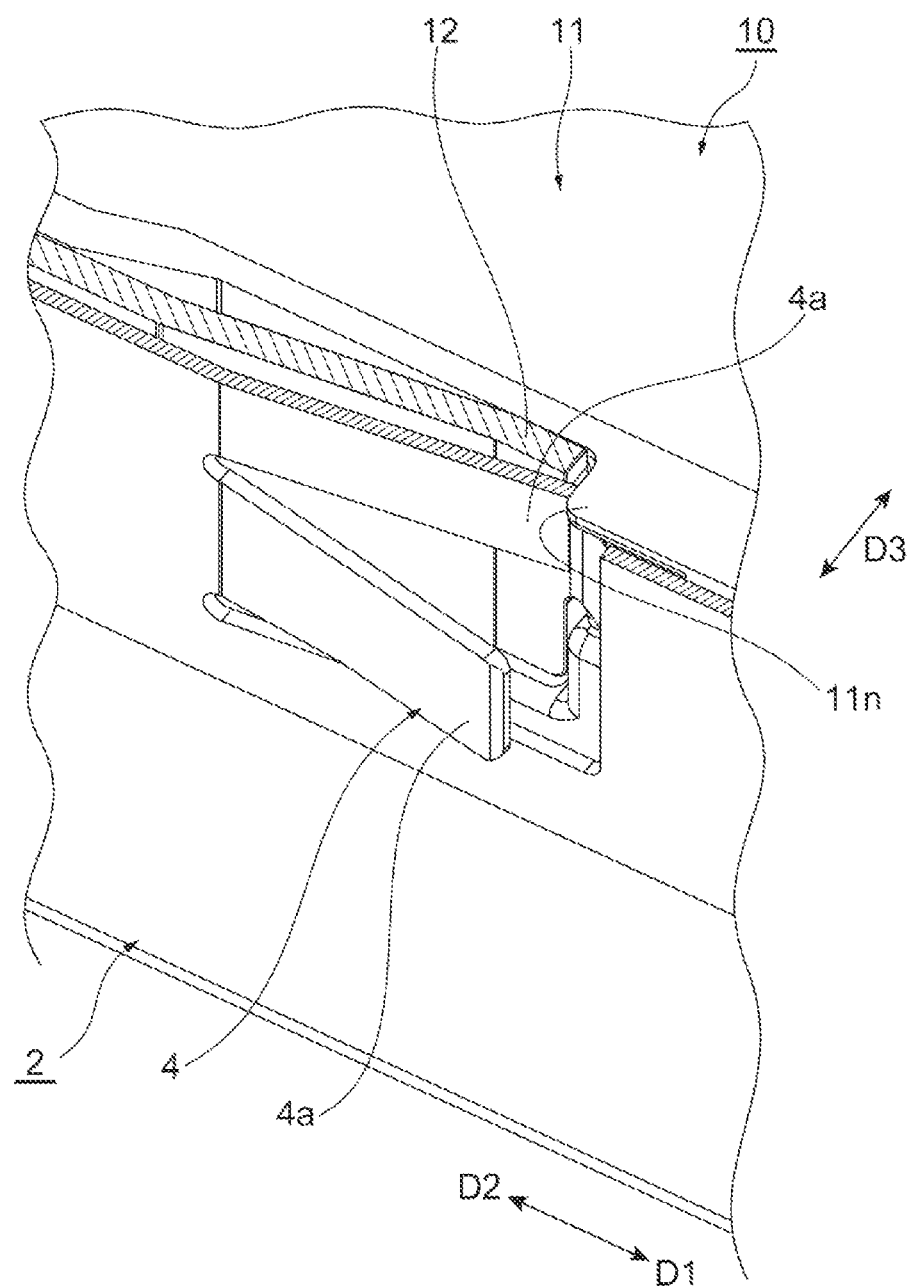
FIG. 16 is a partial cross-sectional perspective view illustrating a cage tab of the cage, the housing, and a slider in FIG. 15.

When the optical transceiver 10 is further pushed in the insertion direction D1, the cover 20 further moves relatively toward the extraction direction D2 such that the contact part 22*a* is brought into contact with the first stopper 11*e*, as illustrated in FIG. 15. Then, a projecting part 11*n* projecting in the width direction D3 of the housing 11 on the side closer to the cage 2 than the slider 12 catches on the plate part 4*a* of the cage tab 4 on the cage 2 side to complete the engagement of the optical transceiver 10 with the cage 2.

Figure 17:
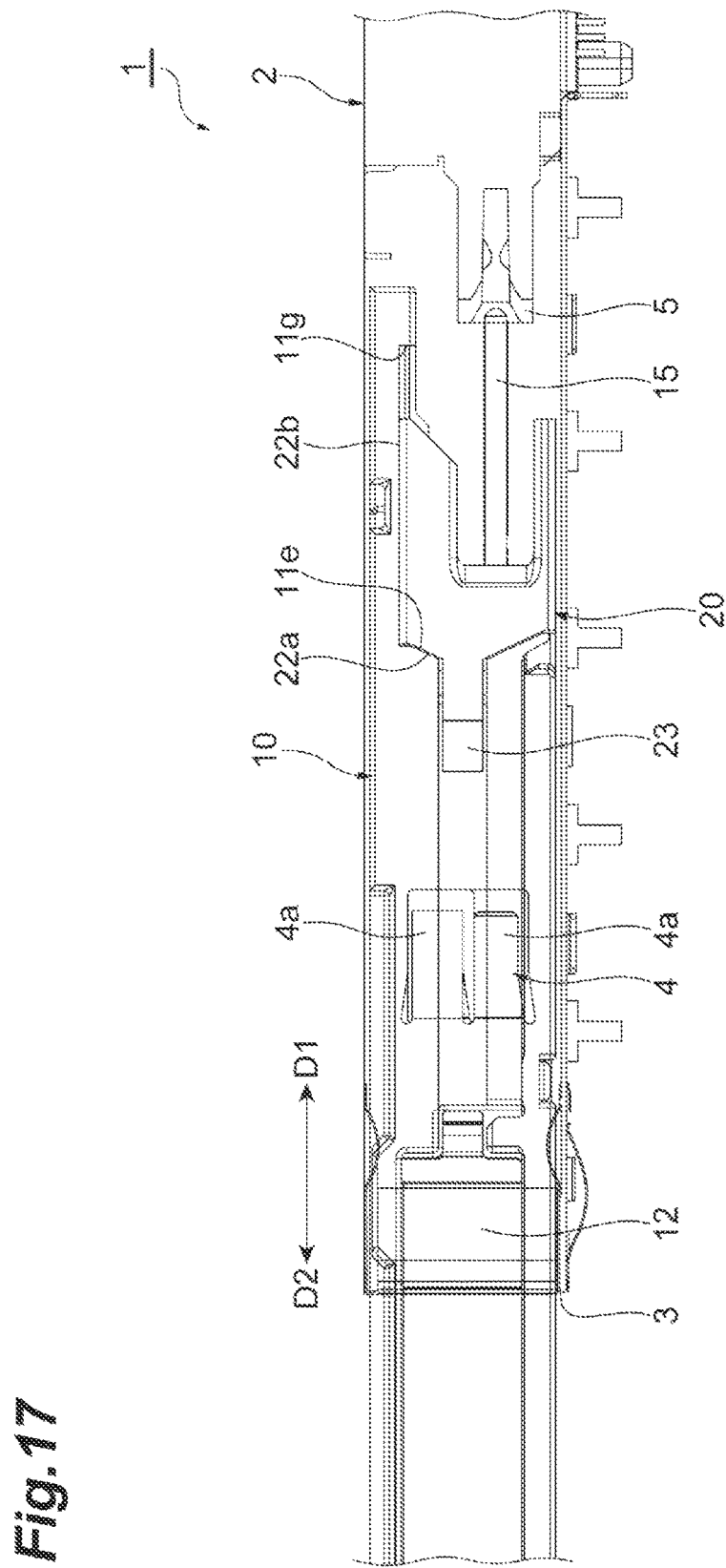
FIG. 17 is a lateral view illustrating a procedure for pulling out the optical transceiver in FIG. 1 from the cage.
Figure 18:
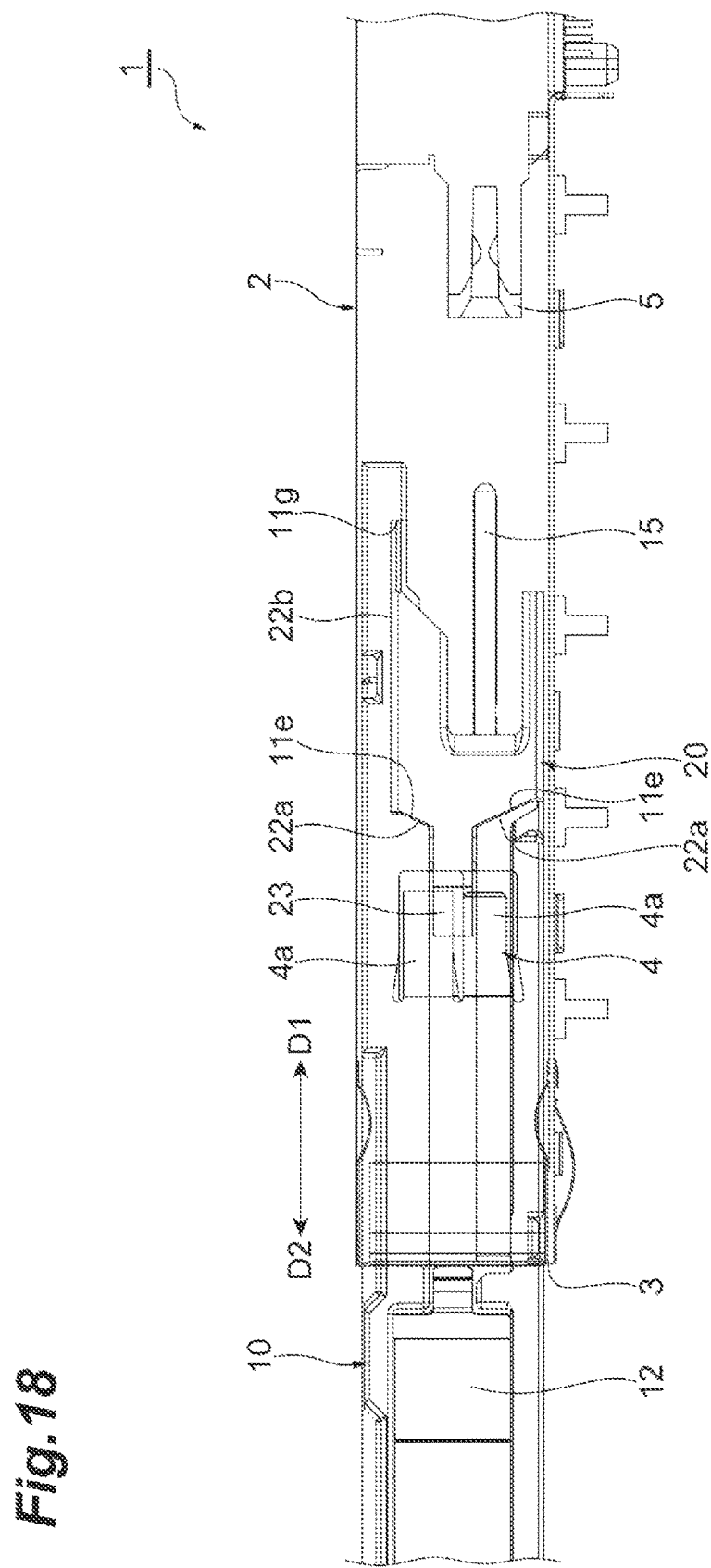
FIG. 18 is a lateral view of the optical transceiver and the cage illustrating a procedure following that in FIG. 17.
Figure 19:
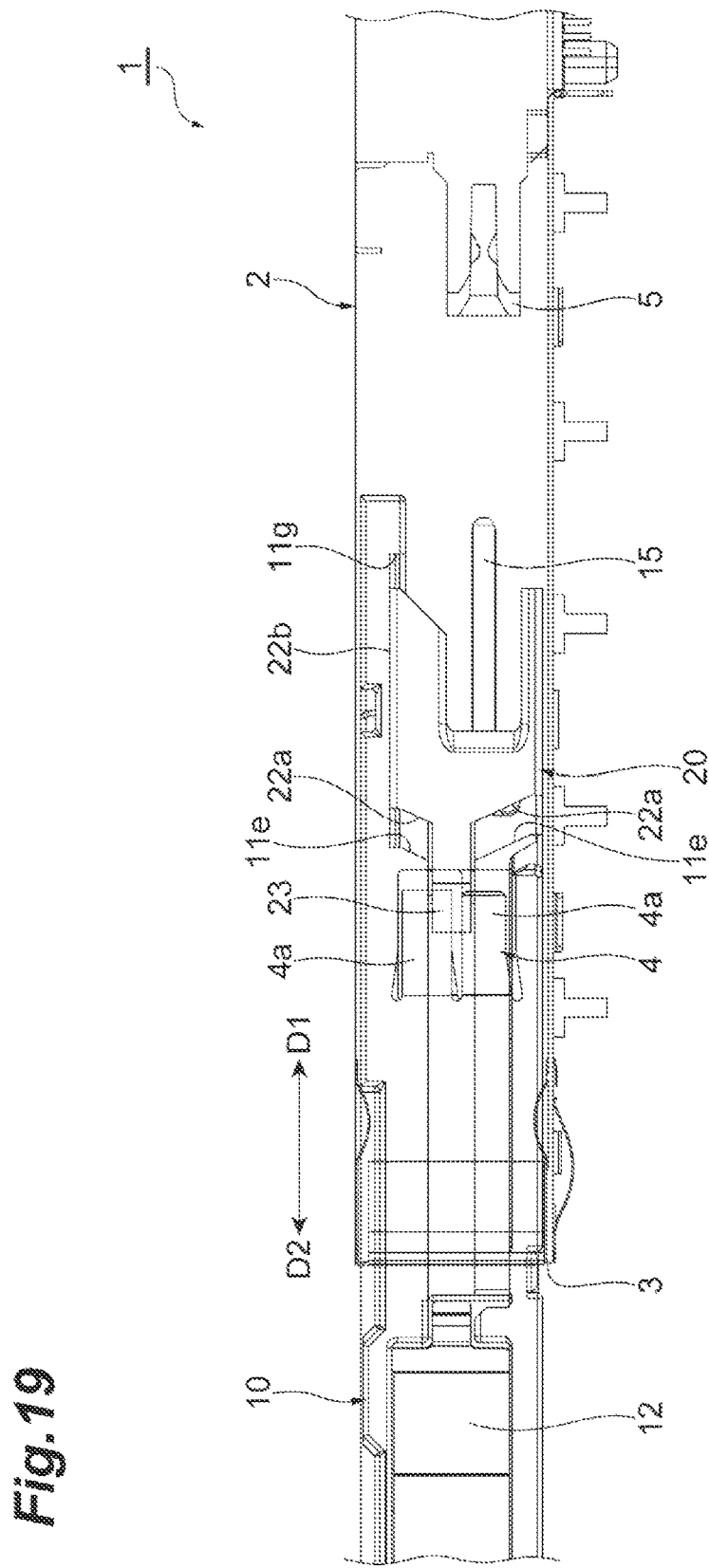
FIG. 19 is a lateral view of the optical transceiver and the cage illustrating a procedure following that in FIG. 18.

Subsequently, a description is given of the operations of the parts when the optical transceiver 10 is pulled from the cage 2 referring to FIG. 17 to FIG. 22. First, as illustrated in FIG. 17, when the optical transceiver 10 is extracted in the extraction direction D2, the engagement of the optical transceiver 10 with the cage 2 starts to be released and the electrical plug 15 is detached (released) from the host connector 5. At this time, the extraction of the optical transceiver 10 is performed by pulling the arms 14*a* and/or the pull-tab 14. Thereby, the slider 12 moves in the extraction direction D2 to release the engaged state. Then, when the optical transceiver 10 is further pulled, the cover tab 23 is brought into contact with the plate part 4*a* of the cage tab 4 such that the cover 20 moves relative to the housing 11 in the insertion direction D1, as illustrated in FIG. 18 and FIG. 19. At this time, the contact part 22*a* departs from the first stopper 11*e* and the bent part 22*b* slides in the insertion direction D1 so that the cover 20 gradually covers the electrical plug 15. In other words, an area of the electrical plug 15 covered by the cover 20 increases, as the cover 20 relatively moves in the insertion direction D1.

Figure 20:
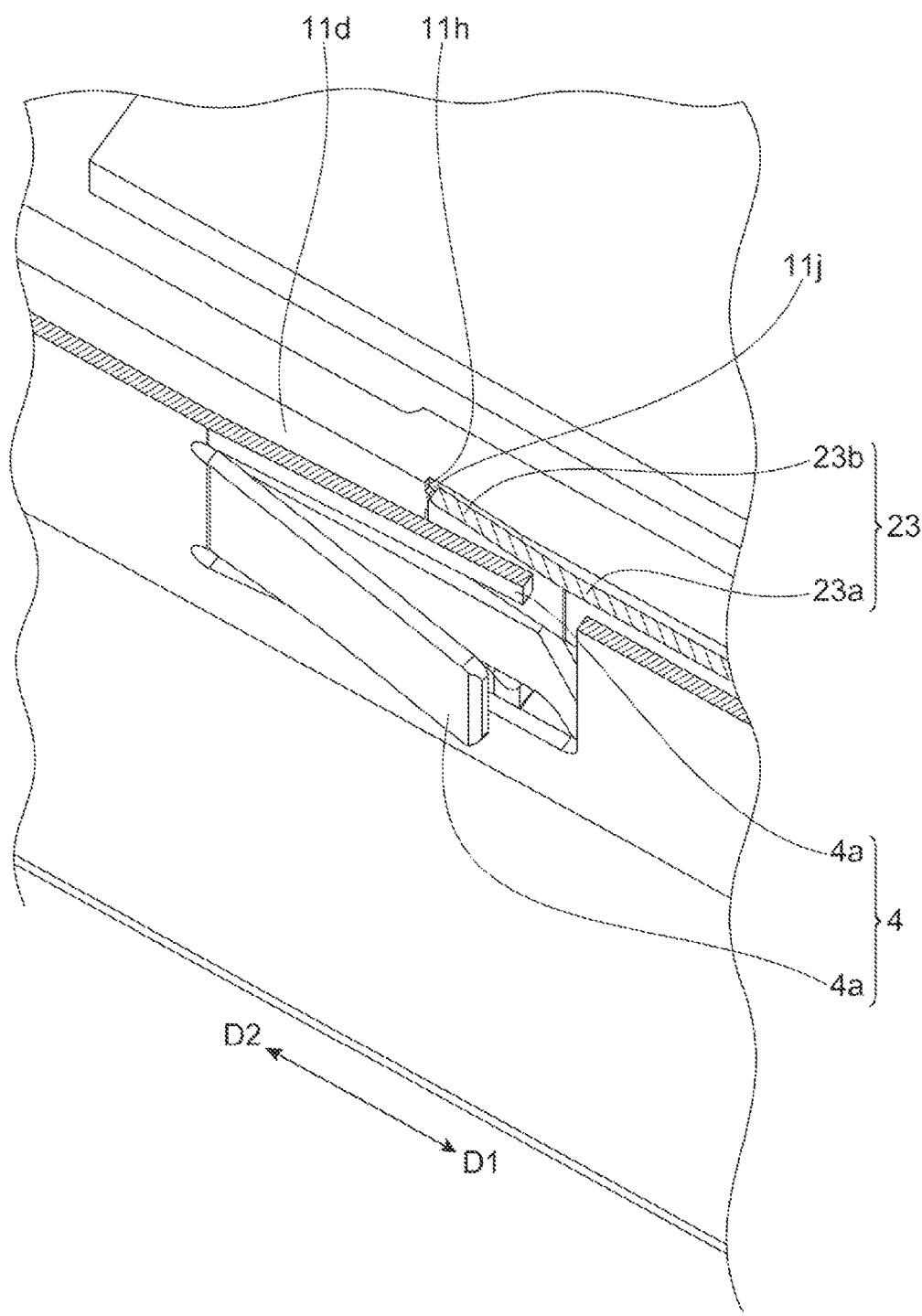
FIG. 20 is a partial cross-sectional perspective view illustrating the cage tab of the cage, the cover tab, and the housing.
Figure 21:
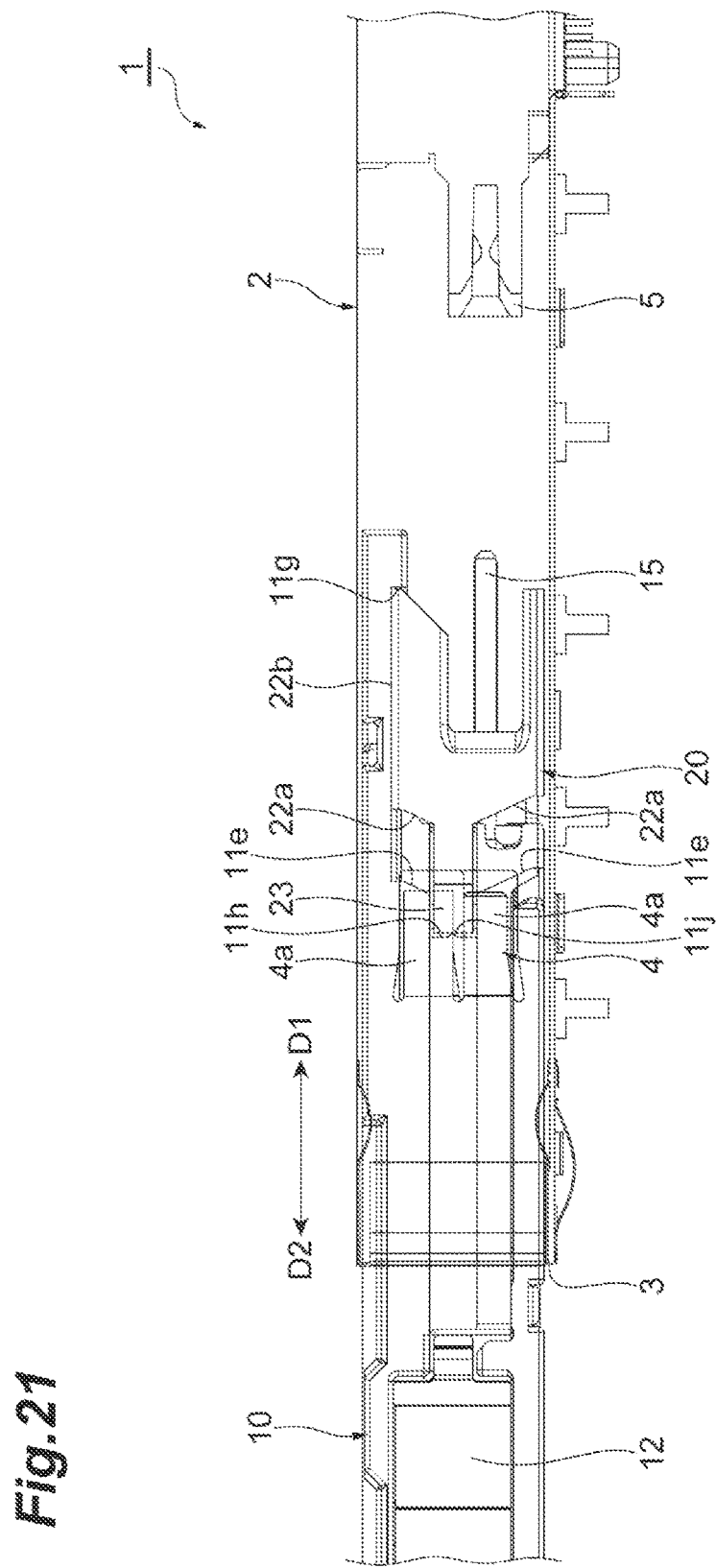
FIG. 21 is a lateral view of the optical transceiver and the cage illustrating a procedure following that in FIG. 20.

After that, as illustrated in FIG. 20 and FIG. 21, when the cover tab 23 moves relatively toward the insertion direction D1 and cover tab 23 reaches the step part 11*h*, the cover tab 23 is caught by the plate part 4*a* to enter the step part 11*h* on the cage 2 side. Then, the end of the bent part 22*b* is brought into contact with the second stopper 11*g* as well as the cover 20 becomes the state of covering a part or all of the electrical plug 15 such that a position of the cover 20 is returned to an initial state before inserted into the cage 2. Further, when the optical transceiver 10 is pulled in the extraction direction D2, as illustrated in FIG. 22, the housing 11 moves together with cover 20 toward the extraction direction D2 such that the housing 11 gets out from the opening 3 to complete the extraction of the optical transceiver 10 from the cage 2.

A description is given of advantages of the embodiment obtained from the optical transceiver 10 configured as above. The optical transceiver 10 includes the electrical plug 15 at the end of the housing 11 on the cage 2 side, and becomes capable of electrical communication with the host system 1, that is, the electrical plug 15 becomes capable of electrical communication with the host system 1 when the housing 11 is inserted into the cage 2. The optical transceiver 10 includes the cover 20 covering the electrical plug 15, where the cover 20 covers the electrical plug 15 when the housing 11 is not inserted into the cage 2. Therefore, in the state where the housing 11 is not inserted into the cage 2, the electrical plug 15 can be protected by the cover 20 covering the electrical plug 15.

When a user uses the optical transceiver 10, a possibility that fingers or the like are brought into contact with the terminal 15*a* of the electrical plug 15 can be decreased by the cover 20 covering the electrical plug 15. As a result, even if an area of the terminal 15*a* of the electrical plug 15 increases, the terminal 15*a* of the electrical plug 15 can be protected more reliably. The cover 20 moves with respect to the housing 11 to expose the electrical plug 15 when the housing 11 is inserted into the cage 2. Therefore, the electrical plug 15 can be reliably mated with the host connector 5 by the cover 20 moving to expose the electrical plug 15 when the optical transceiver 10 is fully inserted into the cage 2. In other words, the cover 20 moves to not cover the electrical plug 15, which does not inhibit the electrical plug 15 from mating with the host connector 5.

The housing 11 has the groove 11*d* extending in the extraction direction D2 at the end part 11*c* of the housing 11 on the cage 2 side. The cover 20 has the cover body 21 covering the electrical plug 15, and the plate-like cover tab 23 which extends with respect to the cover body 21 in the extraction direction D2 and slides along the groove 11*d*. Owing to these configurations, the cover tab 23 moves relative to the housing 11 in the extraction direction D2 when the pull-tab 14 of the optical transceiver 10 is pushed to the cage 2 in the insertion direction D1 with a certain or more force.

Specifically, the housing 11 has the groove 11*d* extending in extraction direction D2, the cover 20 has the cover tab 23 sliding along the groove 11*d*, and the cover tab 23 moves relative to the housing 11 in the extraction direction D2 when the housing 11 is inserted into the cage 2 in the insertion direction D1. At this time, since the cover tab 23 slides along the groove 11*d* to relatively move in the extraction direction D2, the movement of the cover 20 with respect to the housing 11 can be stabilized. Therefore, the insertion and extraction of the optical transceiver 10 including the cover 20 into and from the cage 2 can be smoothly performed. Since the cover tab 23 does not move unless the optical transceiver 10 is pushed with a certain or more force, a possibility that the cover tab 23 erroneously moves so that the cover 20 unintentionally exposes the electrical plug 15 can be decreased.

The housing 11 has the protrusion 11*j* with which the cover tab 23 is to be contact in the groove 11*d*, and the cover tab 23 surmounts the protrusion 11*j* to move relatively in the extraction direction D2 when the optical transceiver 10 is pushed in the insertion direction (or, pluggable direction) D1 with a certain or more force. The height A1 of the protrusion 11*j* is a half of the plate thickness A2 of the cover tab 23, for example. Therefore, since the cover tab 23 does not surmount the protrusion 11*j* unless the housing 11 pushes the cover tab 23 with an appropriate force, it is possible to prevent the cover 20 from easily moving to expose the electrical plug 15. Accordingly, the combination of the cover tab 23 and the protrusion 11*j* in the groove 11*d* restrains the electrical plug 15 from being unintentionally exposed to a human body.

When the optical transceiver 10 is pulled in the extraction direction D2 with gripping the pull-tab 14, the cover tab 23 is caught by the cage tab 4 provided on the cage 2 such that the cover 20 moves relative to the housing 11 in the insertion direction D1 to move to the position to cover the electrical plug 15. In other words, the cover tab 23 is brought into contact with the cage tab 4 when extracting the housing 11 from the cage 2 such that the cover 20 returns to the position to cover the electrical plug 15. Therefore, since the cage tab 4 can be used to automatically return the cover 20 to the covering position when extracting the housing 11, the electrical plug 15 can be efficiently and reliably protected.

The cover 20 has, on the side closer to the cage 2 than cover tab 23, the hollow 22c extending in the extraction direction D2 from the end on the cage 2 side. Therefore, since the cover 20 has the hollow 22c extending in the extraction direction D2, the cover 20 can be restrained from catching on the cage 2 when inserting the housing 11 into the cage 2. Therefore, the insertion and extraction of the optical transceiver 10 into and from the cage 2 can be smoothly performed.

The cover 20 has the tapered part 22d inclined to the slider 12 side at the end on the cage 2 side in the height direction D4. Therefore, the cover 20 can be restrained from catching on the cage 2 by the tapered part 22d which is inclined to the direction avoiding the contact with the electrical plug 15. Therefore, the insertion and extraction of the optical transceiver 10 can be further smoothly performed.

Hereinabove, the embodiment of the optical transceiver according to the present invention is described, but the invention is not limited to the above described embodiment. That is, various modification and changes of the invention can be made in a scope of the gist described in the claims, which will be easily recognized by those skilled in the art. For example, in the embodiment described above, the optical transceiver 10 is described in which the housing 11 has the protrusion 11j. However, the protrusion 11j may be omitted, and further, the configurations of the housing and the parts of the optical transceiver can be also adequately changed in the scope of the above gist.

For example, in the embodiment described above, the cover 20 is described which has the length L1 of 16 mm, the length L2 of 12 mm, the length L3 of 4.0 mm, the length L4 of 6.7 mm, and the height L5 of 7.0 mm. However, the values of the lengths L1, L2, L3, and L4, and the height L5 are not limited to the above values and can be adequately changed. Those values may be adequately changed depending on the shape, area or the like of the electrical plug 15, for example. In the embodiment described above, the cover 20 is described which has the slope surface 22j inclined to the inside of the width direction D3. By having this slope surface 22j, the cover 20 can be restrained from catching on when inserting and extracting the optical transceiver 10. However, the slope surface 22j can be also adequately omitted. Moreover, for example, the end of the cover body 21 on the side toward the insertion direction D1 may be bent toward the inside of the cover 20, and in this case, access to the inside of the cover 20 by the fingers or the like can be reliably restrained. In this way, the shape, size, materials and arrangement aspects of the cover according to the invention can be adequately changed in the scope of the gist described above.

What is claimed is:

1. An optical transceiver pluggable into an electronic apparatus, comprising:
   a housing having a rectangular solid-like shape extending in a direction pluggable into the electronic apparatus;
   an electrical plug provided on an end of the housing closer to the electronic apparatus in the direction pluggable into the electronic apparatus, the electrical plug being electrically connected with the electronic apparatus when the optical transceiver is plugged into the electronic apparatus; and
   a cover provided on the end of the housing, the cover covering at least a part of the electrical plug when the optical transceiver is extracted from the electronic apparatus, the cover moving with respect to the housing toward an extraction direction opposite to a direction of inserting the optical transceiver into the electronic apparatus (insertion direction) when the optical transceiver is inserted into the electronic apparatus, wherein
   the housing has a groove extending in the extraction direction from the end of the housing,
   the cover has a cover body and a cover tab, the cover body covering the at least a part of the electrical plug, the cover tab extending from the cover body in the extraction direction and slidable along the groove, and
   the cover tab moves relative to the housing along the groove when the cover is pushed toward the housing in the extraction direction by pushing the optical transceiver in the insertion direction with a predetermined force or more.

2. The optical transceiver according to claim 1, wherein the housing has a protrusion brought into contact with the cover tab in the groove, the cover tab surmounts the protrusion to move relatively in the extraction direction when the cover is pushed toward the housing in the extraction direction with the predetermined force or more, and the protrusion has a height that is surmounted by the cover tab is and set to a value smaller than a plate thickness of the cover tab depending on the predetermined force.

3. The optical transceiver according to claim 1, wherein when the optical transceiver is pulled from a state of being plugged into a cage mounted on the electronic apparatus, the cover tab is caught by a cage tab provided on the cage such that the cover moves relative to the housing in the insertion direction to cover the at least a part of the electrical plug.

4. The optical transceiver according to claim 1, wherein the cover has a hollow extending in the extraction direction from an end of the cover closer to the electronic apparatus.

5. The optical transceiver according to claim 1, wherein the cover has a tapered part inclined to a direction avoiding contact with the electrical plug at the end of the cover closer to the electronic apparatus.

* * * * *